(12) United States Patent
Laroche et al.

(10) Patent No.: US 11,979,578 B2
(45) Date of Patent: *May 7, 2024

(54) METHOD AND APPARATUS FOR ENCODING OR DECODING VIDEO DATA IN FRUC MODE WITH REDUCED MEMORY ACCESSES

(71) Applicant: CANON KABUSHIKI KAISHA, Tokyo (JP)

(72) Inventors: Guillaume Laroche, Saint Aubin D'Aubigne (FR); Patrice Onno, Rennes (FR); Jonathan Taquet, Talensac (FR); Christophe Gisquet, Acigne (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/163,602

(22) Filed: Feb. 2, 2023

(65) Prior Publication Data
US 2023/0179773 A1 Jun. 8, 2023

Related U.S. Application Data

(63) Continuation of application No. 17/524,279, filed on Nov. 11, 2021, now Pat. No. 11,595,659, which is a continuation of application No. 16/626,253, filed as application No. PCT/EP2018/066786 on Jun. 22, 2018, now Pat. No. 11,202,076.

(30) Foreign Application Priority Data

Jun. 30, 2017 (GB) .................................... 1710567

(51) Int. Cl.
H04N 19/137 (2014.01)
H04N 19/119 (2014.01)
H04N 19/176 (2014.01)
H04N 19/52 (2014.01)

(52) U.S. Cl.
CPC ......... *H04N 19/137* (2014.11); *H04N 19/119* (2014.11); *H04N 19/176* (2014.11); *H04N 19/52* (2014.11)

(58) Field of Classification Search
None
See application file for complete search history.

(56) References Cited

U.S. PATENT DOCUMENTS

| 2002/0012396 A1 | 1/2002 | Pau et al. |
| 2014/0092968 A1 | 4/2014 | Guillemot et al. |
| 2016/0021385 A1* | 1/2016 | Chou .................. H04N 19/513 375/240.16 |

FOREIGN PATENT DOCUMENTS

| CN | 104754342 A1 | 7/2015 |
| KR | 10-2006-0055555 A1 | 5/2006 |

\* cited by examiner

*Primary Examiner* — Edemio Navas, Jr.
(74) *Attorney, Agent, or Firm* — Canon U.S.A., Inc. IP Division

(57) ABSTRACT

The present disclosure concerns a method and a device for encoding or decoding video data. It concerns more particularly the encoding according to a particular encoding mode using a decoder side motion vector derivation mode referenced as frame-rate up conversion mode or FRUC mode. It concerns encoding and decoding improvement which reduce the need for memory accesses when using an encoding mode where the motion information is predicted using a decoder side motion vector derivation method.

14 Claims, 24 Drawing Sheets

METHOD AND APPARATUS FOR ENCODING OR DECODING VIDEO DATA IN FRUC MODE WITH REDUCED MEMORY ACCESSES

CROSS REFERENCE TO RELATED APPLICATION

This application is a continuation, and claims the benefit, of U.S. patent application Ser. No. 17/524,279, presently pending and filed on Nov. 11, 2021, which is a continuation, and claims the benefit, of U.S. patent application Ser. No. 16/626,253, filed on Dec. 23, 2019, now issued as U.S. Pat. No. 11,202,076 on Dec. 14, 2021, which is a National Phase application of PCT Application No. PCT/EP2018/066786, filed on Jun. 22, 2018. This application claims the benefit under 35 U.S.C. § 119(a)-(d) of, and priority to, United Kingdom Patent Application No. 1710567.7, filed on Jun. 30, 2017. The above cited patent applications are incorporated herein by reference in their entirety.

FIELD OF THE INVENTION

The present disclosure concerns a method and a device for encoding or decoding video data. It concerns more particularly the encoding according to a particular encoding mode using a decoder side motion vector derivation mode referenced as frame-rate up conversion mode or FRUC mode.

BACKGROUND OF INVENTION

Predictive encoding of video data is based on the division of frames into blocks of pixels. For each block of pixels, a predictor block is searched in available data. The predictor block may be a block in a reference frame different from the current one in INTER coding modes, or generated from neighbouring pixel in the current frame in INTRA coding modes. Different encoding modes are defined according to different way of determining the predictor block. The result of the encoding is an indication of the predictor block and a residual block consisting in the difference between the block to be encoded and the predictor block.

Regarding INTER coding modes, the indication of the predictor block is a motion vector giving the location in the reference image of the predictor block relatively to the location of the block to be encoded. The motion vector is itself predictively encoded based on a motion vector predictor. The HEVC (High Efficiency Video Coding) standard defines several known encoding modes for predictive encoding of motion vectors, namely the AMVP (Advanced Motion Vector Prediction) mode, the merge derivation process. These modes are based on the construction of a candidate list of motion vector predictor and the signalling of an index of the motion vector predictor in this list to be used for encoding. Typically, a residual motion vector is also signalled.

Recently, a new coding mode regarding the motion vector prediction has been introduced, named FRUC, that defines a decoder side derivation process of the motion vector predictor with no signalling at all. The result of the derivation process is to be used as the motion vector predictor without any transmission of an index or a residual motion vector by the decoder.

Current implementation of FRUC mode encoding and decoding generate a lot of memory accesses increasing significantly the memory access worst case that must be considered by the decoder compared to known encoding modes.

SUMMARY OF INVENTION

The present invention has been devised to address one or more of the foregoing concerns. It concerns encoding and decoding improvement which reduce the need for memory accesses when using an encoding mode where the motion information is predicted using a decoder side motion vector derivation method.

According to a first aspect of the invention there is provided a method for decoding image data comprising one or more frames from a bitstream, each frame being split into blocks of pixels, the method comprising for a block of pixels:

determining a motion vector for bi-prediction to be refined;

deriving pixel values in a search range for refinement of the determined motion vector, based on the determined motion vector to be refined;

performing first refinement which refines the determined motion vector based on the search range, to determine a first position for refinement of the determined motion vector, the first position corresponding to a best position in the first refinement;

performing second refinement which refines the first position at sub pixel accuracy, to determine a second position for refinement of the determined motion vector; and decoding the block of pixels using a motion vector based on the second position, when the second refinement is performed, wherein the motion vector based on the second position is not directly signalled in the bitstream when the second refinement is performed, wherein, when a pixel value outside of the search range is necessary for the second refinement, performing the second refinement is constrained so that the pixel value outside of the search range is not used.

In an embodiment, the second position is at $1/16$ pixel accuracy.

In an embodiment, if pixel values within the search range are not available, the second refinement comprises selecting maximum full-pixel positions of said search range used for the first refinement.

According to another aspect of the invention there is provided a method for encoding image data comprising one or more frames into a bitstream, each frame being split into blocks of pixels, the method comprising for a block of pixels:

determining a motion vector for bi-prediction to be refined;

deriving pixel values in a search range for refinement of the determined motion vectors, based on the determined motion vector to be refined;

performing first refinement which refines the determined motion vector based on the search range, to determine a first position for refinement of the determined motion vector, the first position corresponding to a best position in the first refinement;

performing second refinement which refines the first position at sub pixel accuracy, to determine a second position for refinement of the determined motion vector; and encoding the block of pixels using a motion vector based on the second position without signalling, in the bitstream, the motion vector based on the second position, when the second refinement is performed, wherein, when a pixel value outside of the search range is necessary for the second refinement, performing the second refinement is constrained so that the pixel value outside of the search range is not used.

In an embodiment, the second position is at 1/16 pixel accuracy.

In an embodiment, if pixel values within the search range are not available, the second refinement comprises selecting maximum full-pixel positions of said search range used for the first refinement.

According to another aspect of the invention there is provided an apparatus for decoding image data comprising one or more frames from a bitstream, each frame being split into blocks of pixels, the apparatus comprising for a block of pixels:

a determining unit configured to determine a motion vector for bi-prediction to be refined;

a deriving unit configured to derive pixel values in a search range for refinement of the determined motion vector, based on the determined motion vector to be refined;

a first performing unit configured to perform first refinement which refines the determined motion vector based on the search range, to determine a first position for refinement of the determined motion vector, the first position corresponding to a best position in the first refinement;

a second performing unit configured to perform second refinement which refines the first position at sub pixel accuracy, to determine a second position for refinement of the determined motion vector; and a decoding unit configured to decode the block of pixels using a motion vector based on the second position, when the second refinement is performed, wherein the motion vector based on the second position is not directly signalled in the bitstream when the second refinement is performed, wherein when a pixel value outside of the search range is necessary for the second refinement, performing the second refinement is constrained so that the pixel value outside of the search range is not used.

In an embodiment, the second position is at 1/16 pixel accuracy.

In an embodiment, if pixel values within the search range are not available, the second refinement comprises selecting maximum full-pixel positions of said search range used for the first refinement.

According to another aspect of the invention there is provided an apparatus for encoding image data comprising one or more frames into a bitstream, each frame being split into blocks of pixels, the apparatus comprising for a block of pixels:

a determining unit configured to determine a motion vector for bi-prediction to be refined;

a deriving unit configured to derive pixel values in a search range for refinement of the determined motion vector, based on the determined motion vector to be refined;

a first performing unit configured to perform first refinement which refines the determined motion vector based on the search range, to determine a first position for refinement of the determined motion vector, the first position corresponding to a best position in the first refinement;

a second performing unit configured to perform second refinement which refines the first position at sub pixel accuracy, to determine a second position for refinement of the determined motion vector; and an encoding unit configured to encode the block of pixels using a motion vector based on the second position without signalling, in the bitstream, the motion vector based on the second position, when the second refinement is performed, wherein, when a pixel value outside of the search range is necessary for the second refinement, performing the second refinement is constrained so that the pixel value outside of the search range is not used.

In an embodiment, the second position is at 1/16 pixel accuracy.

In an embodiment, if pixel values within the search range are not available, the second refinement comprises selecting maximum full-pixel positions of said search range used for the first refinement.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
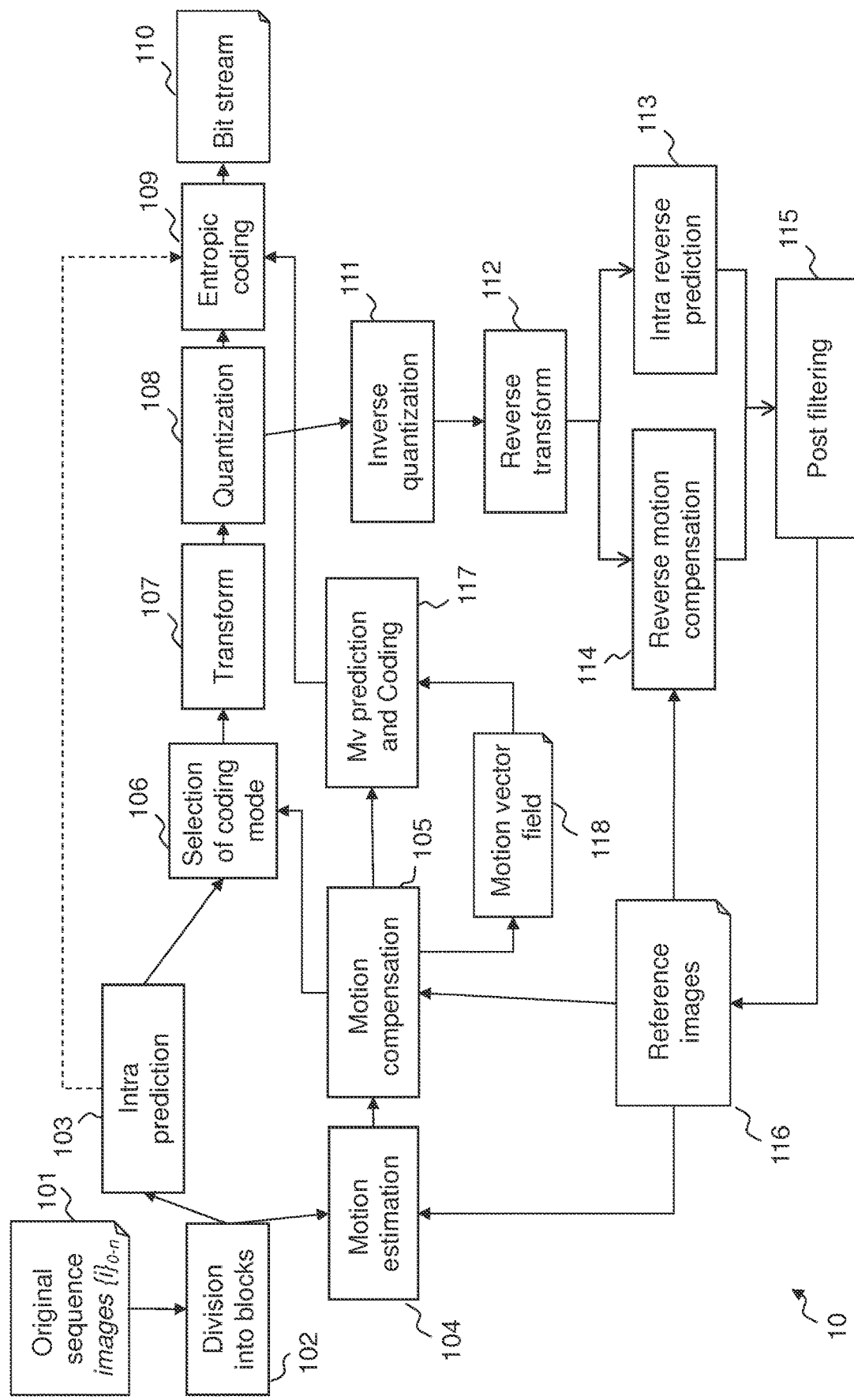
FIG. 1 illustrates the HEVC encoder architecture.

FIG. 1 illustrates the HEVC encoder architecture. In the video encoder, an original sequence 101 is divided into blocks of pixels 102 called coding units. A coding mode is then affected to each block. There are two families of coding modes typically used in HEVC: the modes based on spatial prediction or INTRA modes 103 and the modes based on temporal prediction or INTER modes based on motion estimation 104 and motion compensation 105. An INTRA Coding Unit is generally predicted from the encoded pixels at its causal boundary by a process called INTRA prediction.

Temporal prediction first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

Then, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the encoded and decoded loop. It means that they need to be applied on the reconstructed frame at encoder and decoder side in order to use the same reference frame at encoder and decoder side. The aim of this post filtering is to remove compression artefacts.

Figure 2:
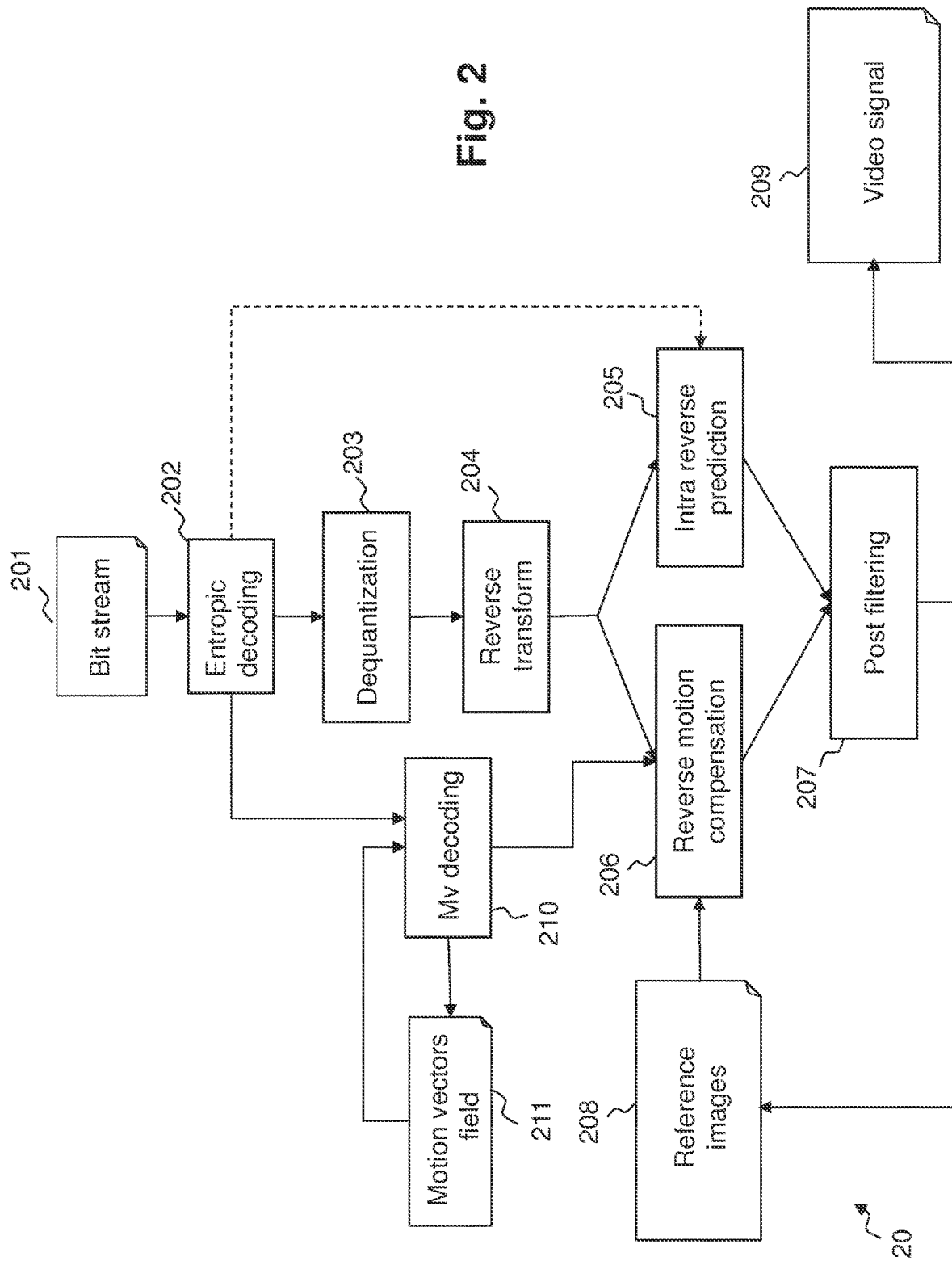
FIG. 2 illustrates the principle of a decoder.

In FIG. 2, have been represented the principle of a decoder. The video stream 201 is first entropy decoded in a module 202. The residual data are then inverse quantized in a module 203 and inverse transformed in a module 204 to obtain pixel values. The mode data are also entropy decoded in function of the mode, an INTRA type decoding or an INTER type decoding is performed. In the case of INTRA mode, an INTRA predictor is determined in function of the INTRA prediction mode specified in the bitstream 205. If the mode is INTER, the motion information is extracted from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

The HEVC standard uses 3 different INTER modes: the Inter mode, the Merge mode and the Merge Skip mode. The main difference between these modes is the data signalling in the bitstream. For the Motion vector coding, the current HEVC standard includes a competitive based scheme for Motion vector prediction compared to its predecessors. It means that several candidates are competing with the rate distortion criterion at encoder side in order to find the best motion vector predictor or the best motion information for respectively the Inter or the Merge mode. An index corresponding to the best predictors or the best candidate of the motion information is inserted in the bitstream. The decoder can derive the same set of predictors or candidates and uses the best one according to the decoded index.

The design of the derivation of predictors and candidates is very important to achieve the best coding efficiency without large impact on complexity. In HEVC two motion vector derivations are used: one for Inter mode (Advanced Motion Vector Prediction (AMVP)) and one for Merge modes (Merge derivation process).

As already mentioned, a candidate of Merge modes ("classical" or Skip) represents all the motion information: direction, list, and reference frame index and motion vectors. Several candidates are generated by the Merge derivation process described in the following, each have an index. In the current HEVC design the maximum candidate for both Merge modes is equal to 5.

Figure 3:
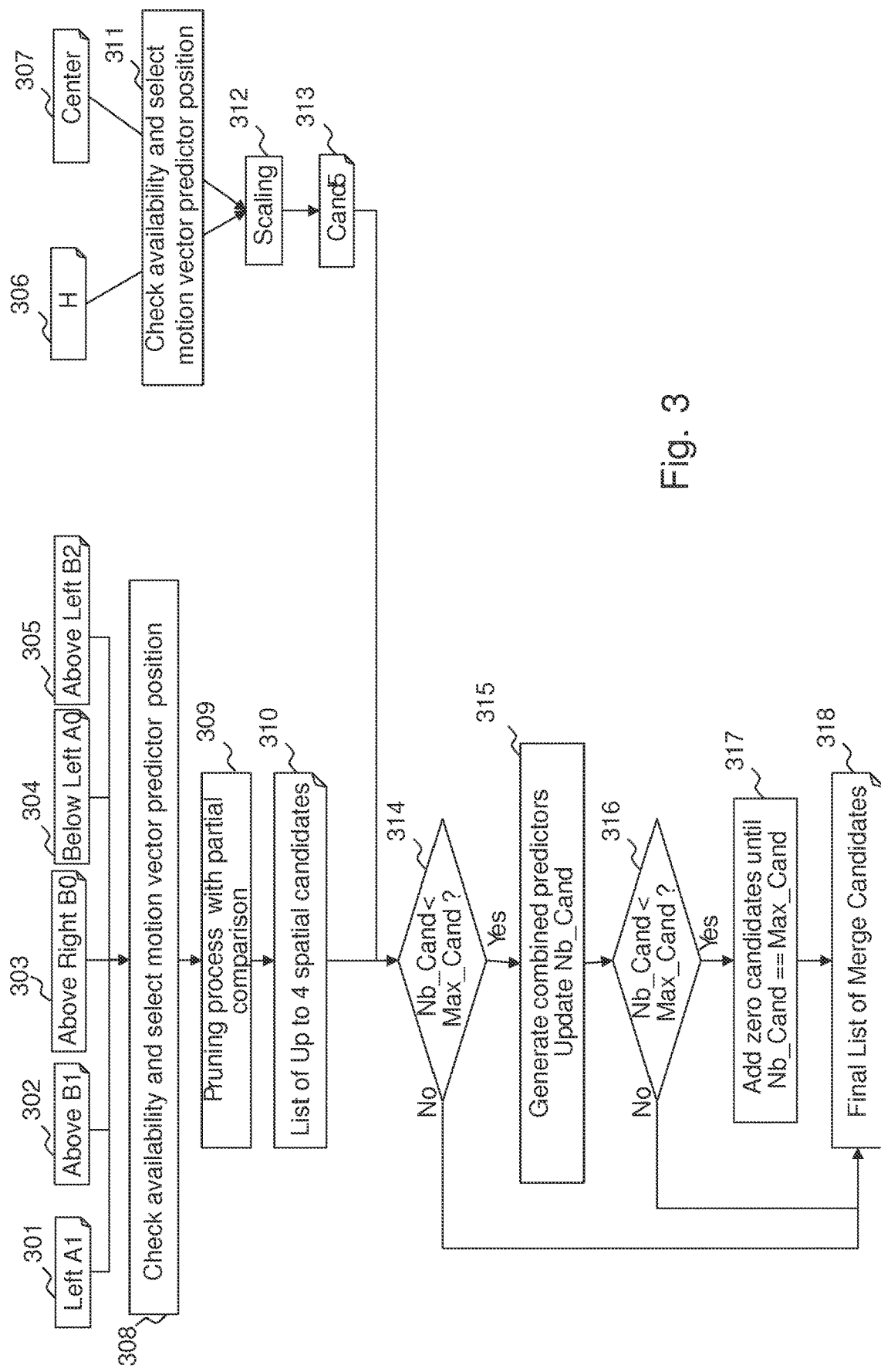
FIG. 3 is the flow chart of the Motion vector derivation process of the Merge modes.

FIG. 3 is the flow chart of the Motion vector derivation process of the Merge modes. In the first step of the derivation, 7 block positions, 301 to 307, are considered. The module 308 checks the availability of the spatial motion vectors and selects at most 5 motion vectors. In this module, a predictor is available if it exists and if this block is not Intra coded. The selection and the check of these 5 motion vectors are described in the following conditions.

If the "Left" A1 motion vector 301 is available, meaning that it exists and it is not Intra coded, the motion vector of the "Left" block is selected and used as the first candidate in a list of spatial candidates 310. The A1 motion vector is the motion vector of the block immediately at the left of the current coding unit.

If the "Above" B1 motion vector 302 is available, the candidate motion vector of the "Above" block is compared to A1, if it exists, in a pruning module 309. If B1 is equal to A1, B1 is not added in the list of spatial candidates 310 otherwise it is added. The B1 motion vector is the motion vector of the block immediately above the current coding unit. The general principle applied by the pruning module 309 is to check any new candidate against previously selected candidates and to prevent the selection of a new candidate with the same value as a previously selected candidate.

If the "Above Right" B0 motion vector 303 is available, and not yet selected in the list, it is also added in the spatial candidate list 310. The B0 motion vector is the motion vector of the block immediately to the left of the one above the current coding unit.

If the "Below Left" A0 motion vector 304 is available 308, and not yet selected in the list, it is also added in the spatial candidate list 310. The A0 motion vector is the motion vector of the block immediately below to the one at the left of the current coding unit.

If the spatial candidates list 310 doesn't contain 4 candidates at this stage, the availability of the "Above Left" B2 motion vector 305 is tested, if it is available and not yet selected in the list, it is also added in the spatial candidate list 310. The B2 motion vector is the motion vector of the block immediately above to the one at the left of the current coding unit.

At the end of this stage the spatial candidates list 310 contains from 0 up to 4 spatial candidates.

For the temporal candidate, 2 positions can be used: the position referenced H 306 corresponds to the bottom right position of the collocated block, and the position referenced center 307 corresponds to the collocated block. Collocated means the block at the same position in the temporal frame. These positions are depicted in FIG. 3.

As AMVP, first the availability of the block at the H position 306 is checked by module 311. If it is not available, then the block at the Center position 307 is checked by module 311. If at least one motion vector of these positions is available, this temporal motion vector can be scaled, if needed, by the scale module 312 to the reference frame with index 0, for both list L0 and L1, if needed, in order to create the temporal candidate 313 which is inserted in the Merge candidates list just after the spatial candidates.

If the number of candidates (Nb_Cand) is strictly inferior to the maximum number of candidates (Max_Cand), tested in step 314, combined candidates are generatet by module 315 otherwise the final list of Merge candidates 318 is built. The module 315, is used only when the current frame for B frame, and it generates several candidates based of the available candidates in the current Merge list. This generation consist in combining the motion vector of list L0 from one candidate with the motion vector of list L1 of a second motion vector candidate.

If the number of candidates (Nb_Cand) is still strictly inferior to the maximum number of candidates (Max_Cand), tested in step 316, zero motion candidates are generated in module 317 to reach the maximum number of candidates in the Merge list of candidates 318.

At the end of this process the final list of Merge candidates 318 is built and contains Max_Cand candidates.

The Merge mode is applied on block of pixels corresponding to prediction units (PU). Yet a prediction unit in Merge mode (as in the inter mode) can be equal to the coding unit size (2N×2N). Moreover, a Merge Skip prediction unit has always the size 2N×2N, in this case the prediction unit is equal to the coding unit. For a Merge mode prediction unit, at encoder side, one candidate is selected and the index is inserted in the bitstream. In HEVC, this index is coded with a unary max code where only the first bit depends on a CABAC context (CABAC stands for "Context-Adaptive Binary Arithmetic Coding" which is an entropic coding method). It means that this first bit is binarized according to a probability. The other bits are binarized with an equi-probability. The maximum value of this unary max depends on a transmitted value in the slice header. Yet, this maximum value can't exceed 5. The unary code has less bit for the lower number than for higher number.

Both standardization groups ITU-T VCEG (Q6/16) and ISO/IEC MPEG (JTC 1/SC 29/WG 11) which have defined the HEVC standard are studying future video coding technologies for the successor of HEVC in a joint collaboration effort known as the Joint Video Exploration Team (JVET). The Joint Exploration Model (JEM) contains HEVC tools and new added tools selected by this JVET group. In particular, this software contains a motion information derivation at decoder side algorithm to encode efficiently the motion information. The list of additional tools is described in a document referenced as JVET-F1001.

To increase the coding efficiency, additional candidates have been added to the classical Merge mode derivation of candidates illustrated by FIG. 3. The main change is the inclusion of the Advanced Temporal Motion Vector Prediction (ATMVP) predictors. The Advanced Temporal Motion Vector Prediction method allows each coding unit to fetch multiple sets of motion information from multiple blocks smaller than the current coding unit in the collocated reference picture. In spatial-temporal motion vector prediction (STMVP) method motion vectors of the sub-coding units are derived recursively by using the temporal motion vector predictor and spatial neighbouring motion vectors. Further detail can be found in the document JVET-F1001.

Figure 4:
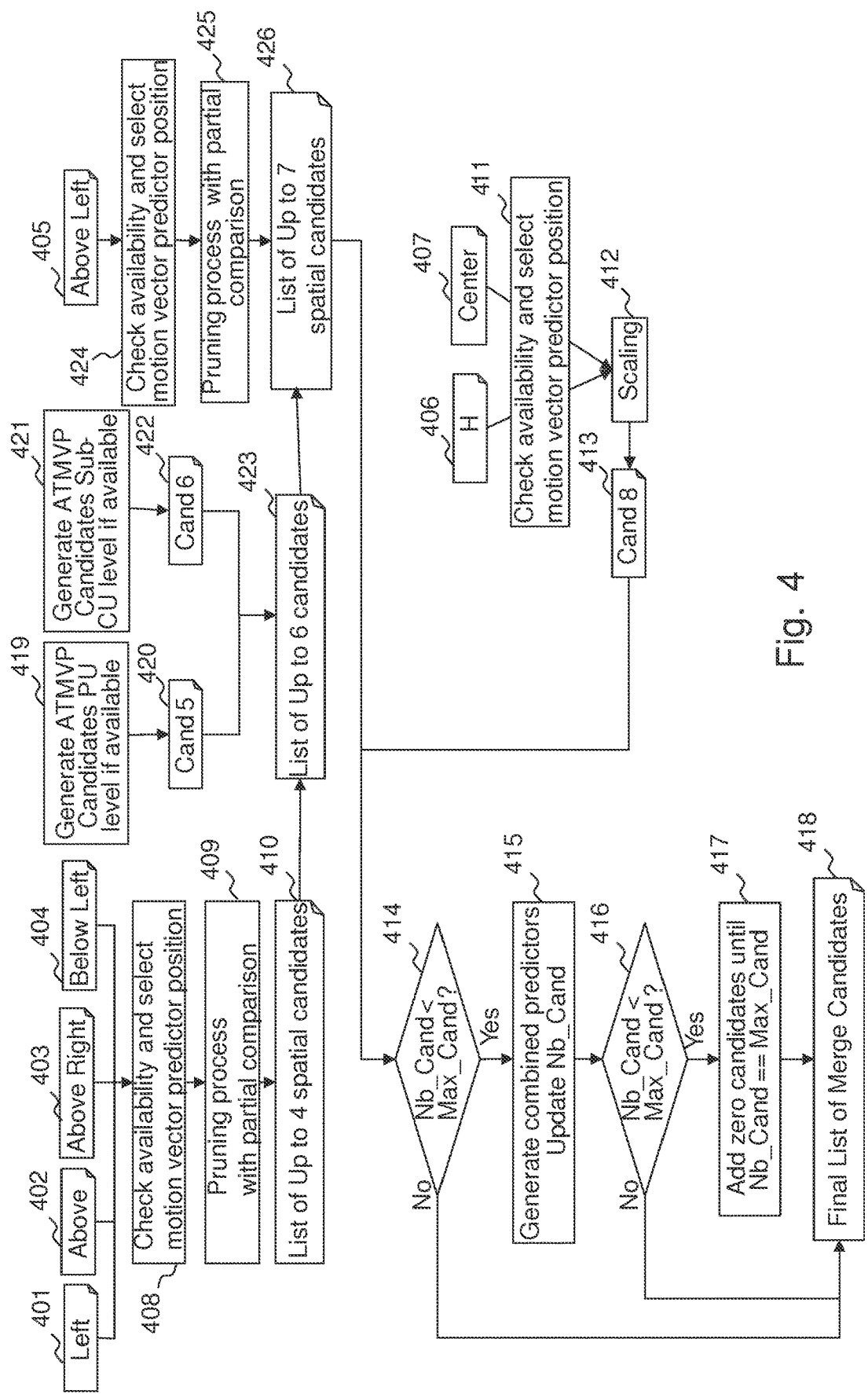
FIG. 4 shows the inclusion of the new ATMVP motion candidates in the generation process of the list of Merge candidates.

FIG. 4 shows the inclusion of the new ATMVP motion candidates in the generation process of the list of Merge candidates illustrated in FIG. 3. Only the differences are described. There are 2 types of ATMVP candidates, the prediction unit level candidates 420 generated by step 419 and the sub-coding unit level candidates 422 generated by step 421. Both types of candidates 420 and 422 are added to the list of spatial predictors 423. The above left spatial candidate 405 is added at the end of the list if it exists and if it is not a duplicate candidate compared to the other spatial candidates. Then the classical temporal predictors are added to this list and the classical derivation of the Merge mode is processed if the number of candidates in the list hasn't reached its maximum. Moreover, the maximum number of candidates for the Merge mode (Max_Cand) has been increased from 5 to 7 in the exemplary implementation called JEM compared to the HEVC standard.

The motion vector derivation at decoder side is denoted as Pattern matched motion vector derivation (PMMVD) in document JVET-F1001. The PMMVD mode in the JEM is a special merge mode based on Frame-Rate Up Conversion (FRUC) techniques. With this mode, motion information of a block is not signalled but derived at decoder side.

Figure 5:
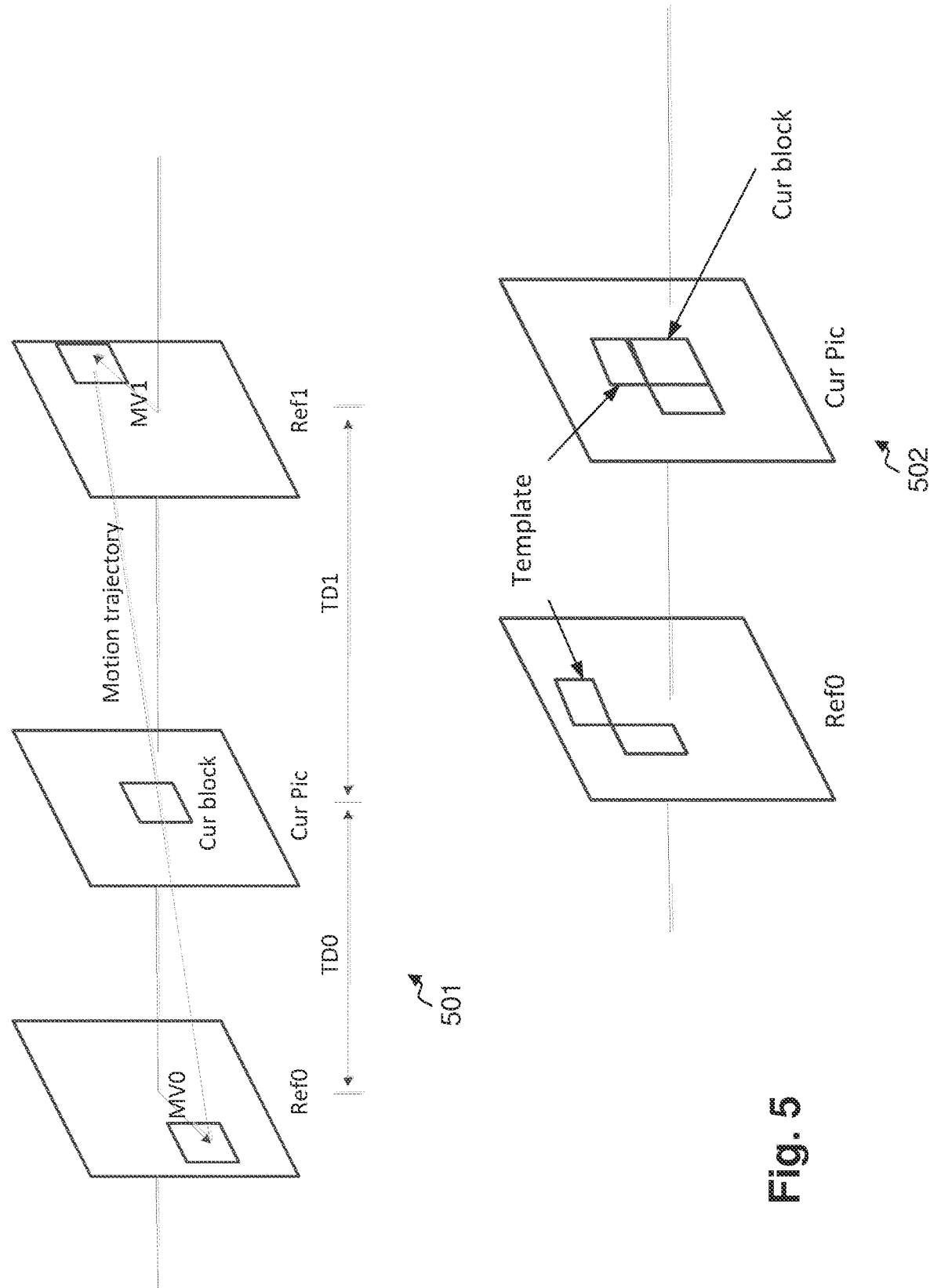
FIG. 5 illustrates the template matching and the bilateral matching in FRUC merge mode.

Two types of search are possible with the current version of the JEM: the template matching and the bilateral matching. FIG. 5 illustrates these two methods. The principle of the bilateral matching 501 is to find the best match between two blocks along the motion trajectory of the current coding unit.

The principle of the template matching 502 is to derive the motion information of the current coding unit by computing the match cost between the reconstructed pixels around the current block and the neighboring pixels around the block pointed by the evaluated motion vector. The template corresponds to a pattern of neighbouring pixels around the current block and to the corresponding pattern of neighbouring pixels around the predictor block.

For both matching types (template or bilateral), the different matches cost computed are compared to find the best one. The motion vector or the couple of motion vectors that obtain the best match is selected as derived motion information. Further details can be found in JVET-F1001.

Both Matching methods offer the possibility to derive the entire motion information, motion vector, reference frame, type of prediction. The motion information derivation at decoder side, noted "FRUC" in the JEM, is applied for all HEVC inter modes: AMVP, Merge and Merge Skip.

For AMVP all the motion information is signalled: uni or bi prediction, reference frame index, predictors index motion vector and the residual motion vector, the FRUC method is applied to determine a new predictor which is set at the first predictor if the list of predictor. So it has the index 0.

For Merge and Merge Skip mode, a FRUC flag is signalled for a CU. When the FRUC flag is false, a merge index is signalled and the regular merge mode is used. When the FRUC flag is true, an additional FRUC mode flag is signalled to indicate which method (bilateral matching or template matching) is to be used to derive motion information for the block. Please note that the bilateral matching is applied only for B frames and not for P frames.

For Merge and Merge Skip mode, a motion vector field is defined for the current block. It means that a vector is defined for a sub-coding unit smaller than the current coding unit. Moreover, as for the classical Merge one Motion vector for each list can form the motion information for a block.

Figure 6:
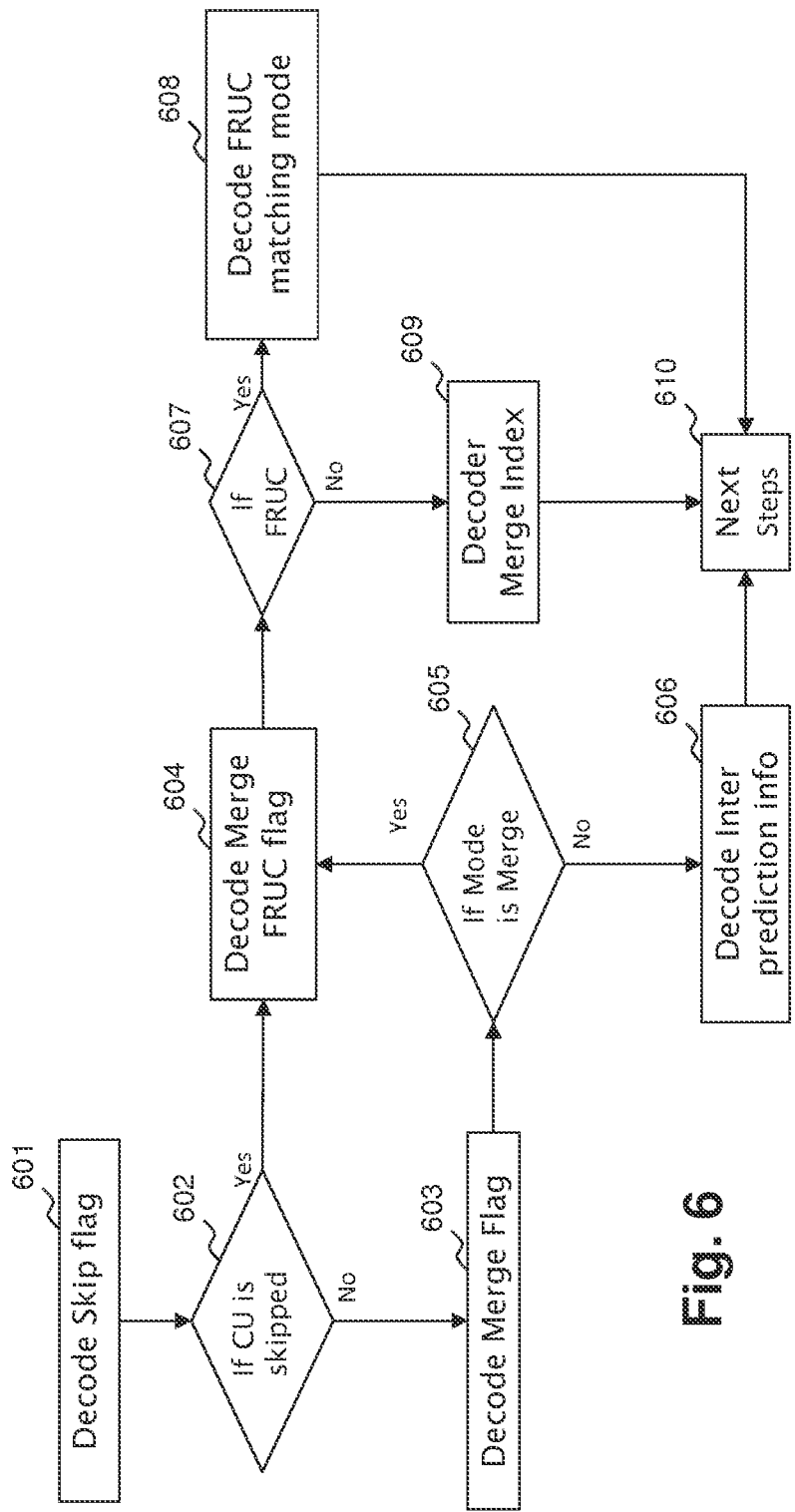
FIG. 6 illustrates the decoding of the FRUC Merge information.

FIG. 6 is a flow chart which illustrates this signaling of FRUC flag for the Merge modes for a block. A block can be a coding unit or a prediction unit according to the HEVC wording.

In a first step 601, the Skip flag is decoded to know if the coding unit is encoded according to the Skip mode. If this flag is false, tested in step 602, the Merge Flag is then decoded in a step 603 and tested in a step 605. When the coding unit is encoded according to Skip or Merge mode, the Merge FRUC flag is decoded in a step 604. When the coding unit is not encoded according to Skip or Merge mode, the intra prediction info of the classical AMVP inter modes are decoded in a step 606. When the FRUC flag of the current coding unit is true, tested in a step 607, and if the current slice is a B slice, the matching mode flag is decoded in a step 608. It should be noted that bilateral matching in FRUC is only available for B slices. If the slice is not a B slice and FRUC is selected, the mode is necessarily template matching and the matching mode flag is not present. If the coding unit is not FRUC the classical Merge index is then decoded in a step 609.

Figure 7:
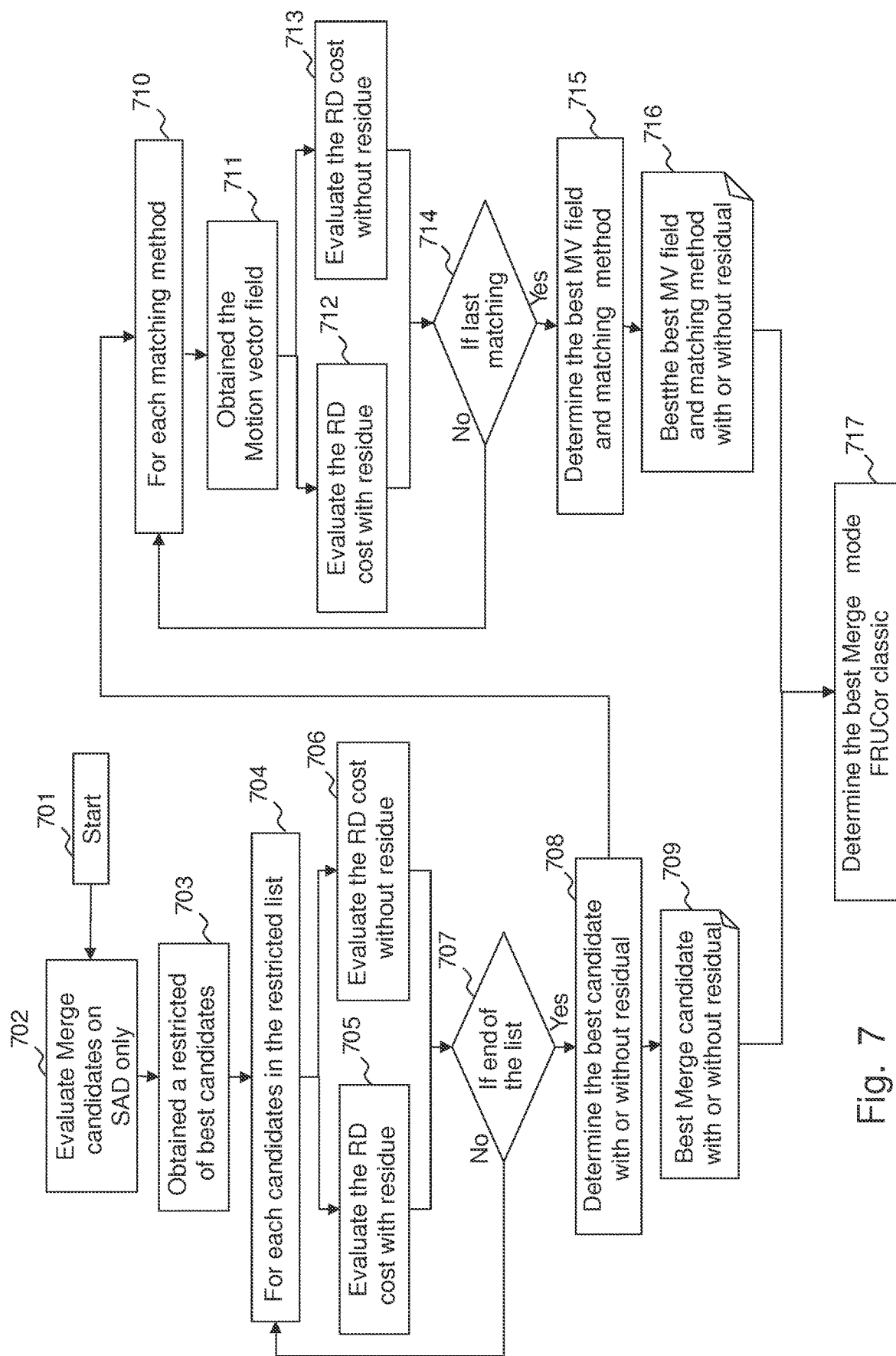
FIG. 7 illustrates the encoder evaluation of the Merge mode and the Merge FRUC mode.

The FRUC Merge mode is competing at encoder side with the classical Merge mode (and other possible Merge). FIG. 7 illustrates the current encoding mode evaluation method in the JEM. First the classical Merge mode of HEVC is evaluated in a step 701. The candidate list is first evaluated with simple SAD (Sum of Absolute Difference) between the original block and each candidates of the list in a step 702. Then a real rate distortion (RD) cost of each candidates of a list of restricted candidates, illustrated by steps 704 to 708, is evaluated. In the evaluation, the rate distortion with, step 705, and a rate distortion without a residual, step 706, are evaluated. At the end, the best merge candidate is determined in step 709, this best merge candidate may have a residual or not.

Then the FRUC Merge mode is evaluated in steps 710 to 716. For each matching method, step 710, namely the bilateral and template matching, the motion vector field for the current block is obtained in a step 711 and full rate distortion cost evaluations with and without a residual are computed in steps 712 and 713. The best motion vector 716, with or without residual, is determined in step 715 based on these rate distortion costs. Finally, the best mode between the classical Merge mode and the FRUC Merge mode is determined in step 717 before possible evaluation of other modes.

Figure 8:
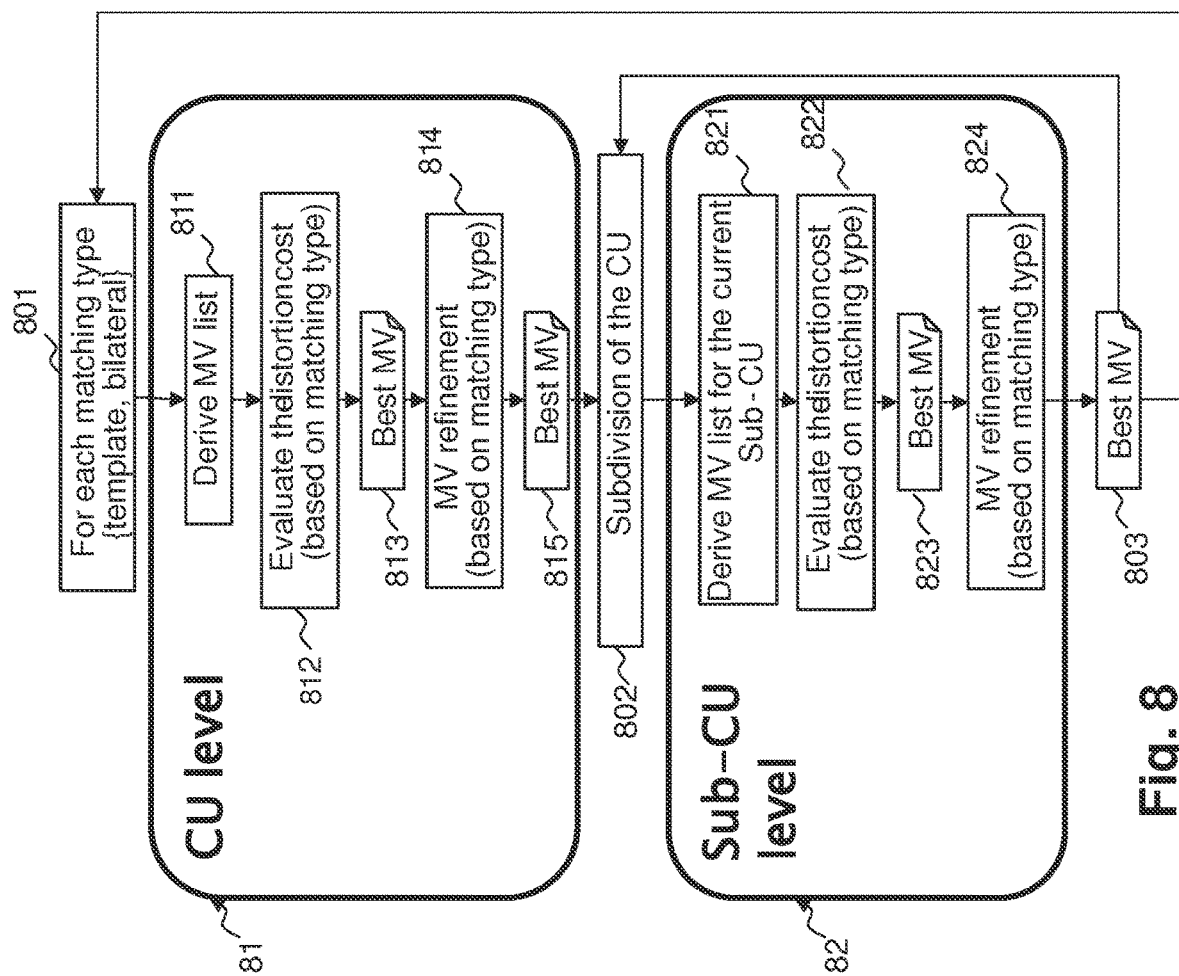
FIG. 8 illustrates the Merge FRUC mode derivation at coding unit and Sub-coding unit levels of the JEM.

FIG. 8 illustrates the FRUC Merge evaluation method at encoder side. For each matching type, step 801, namely the template matching type and the bilateral one, the coding unit level is first evaluated by module 81, followed by the sub-coding unit level evaluation by module 82. The goal is to find a motion information for each sub-coding unit in the current coding unit 803.

Module 81 handles the coding unit level evaluation. A list of motion information is derived in step 811. For each Motion information of this list the distortion cost is computed and compared with each other in step 812. The best motion vectors for template or best couple for bilateral 813 are those which minimize the cost. Then a motion vector refinement step 814 is applied to improve this accuracy of the obtained motion vector. With FRUC method, a bilinear interpolation is used instead of the classical Discrete Cosine Transform Interpolation Filter (DCTIF) interpolation filter for the template matching estimation. This offers a reduction of the memory access around the block to only one pixel instead of the 7 pixels around the block for the traditional DCTIF. Indeed the bilinear interpolation filter needs only 2 pixels to obtain the sub-pixel value for one direction.

After the motion vector refinement, a better motion vector for the current coding unit is obtained in step 815. This motion vector will be used for the sub-coding unit level evaluation.

The current coding unit is subdivided into several sub-coding unit in step 802. A sub-coding unit is a square block which depends on the splitting depth of the coding unit in the quad tree structure. The minimum size is 4×4.

For each sub-CU, the sub-CU level evaluation module 82 evaluates a best motion vector. A motion vector list is derived in step 821 including the best motion vector obtained at CU level in step 815. For each motion vector the distortion cost is evaluated in step 822. But the cost also comprises a cost representing the distance between the best motion vector obtained at coding unit level and the current motion vector to avoid a divergent motion vector field. The best motion vector 823 is obtained based on the minimal cost. This vector 823 is then refined with the MV refinement process 824 in the same way as done at CU level in step 814.

At the end of the process, for one matching type, a motion information is for each sub-CU is obtained. At encoder side the best RD cost between both matching types are compared to select the best one. At decoder side this information is decoded from the bitstream (in step 608 of FIG. 6).

Figure 9:
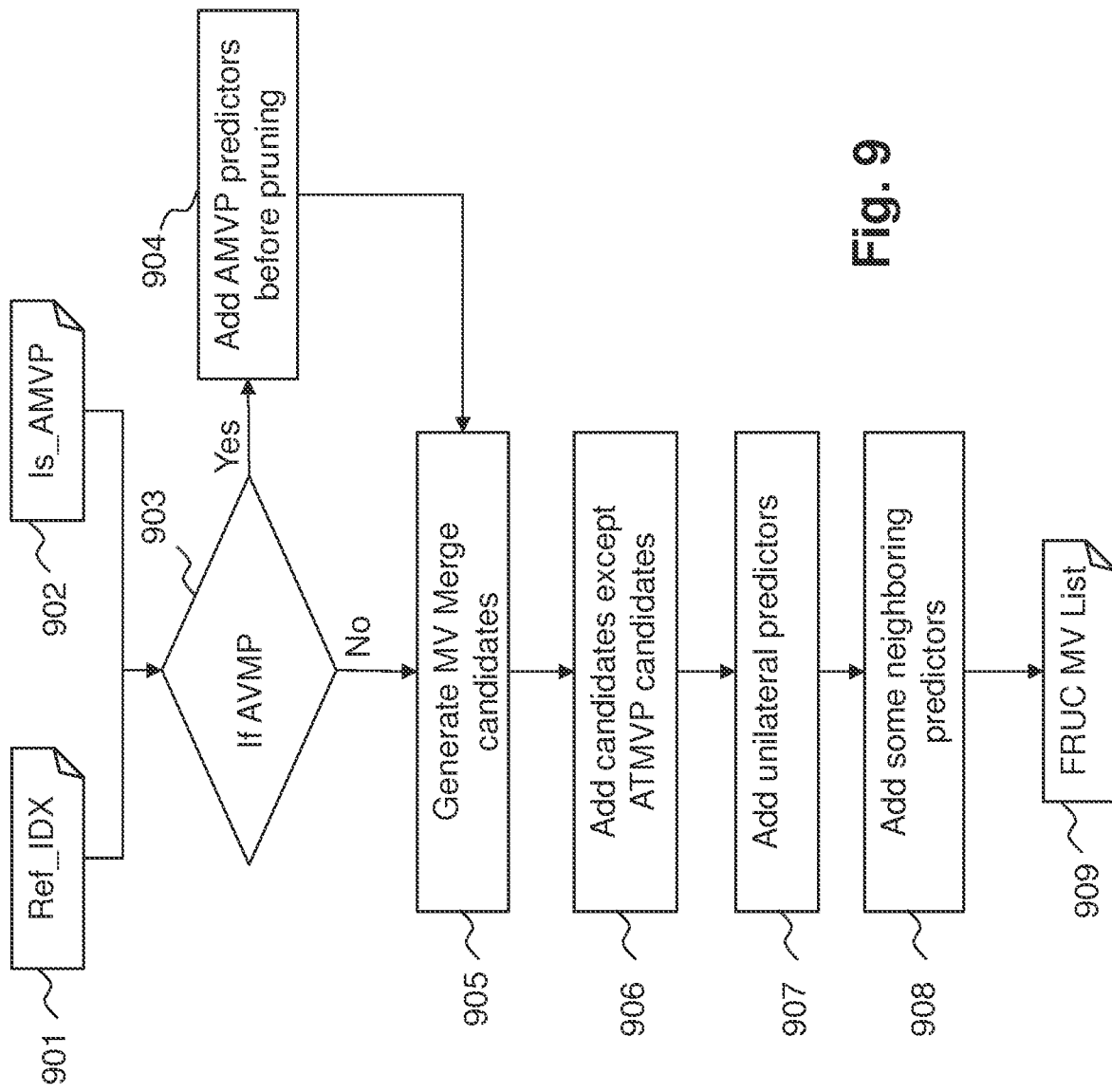
FIG. 9 illustrates the motion vector list derivation for the coding unit level.

For FRUC Merge mode or AMVP, the list of motion vectors is different for the coding unit level to the list for the sub-coding unit level. FIG. 9 illustrates the motion vector derivation process for the coding unit level step 811 of FIG. 8.

This process can be implemented independently for each List L0 or L1. The process takes some inputs corresponding to the index of a reference frame 901 and a flag 902 indicating if the coding mode is AMVP. Then, it is checked that the current mode is AVMVP or Merge mode in the test step 903. If it is AMVP, the AMVP predictors are added to the list in a step 904. These predictors are the left, the above and the temporal predictors obtained in the AMVP process. This step adds in maximum 3 predictors in the list.

Then the motion vector Merge candidates are generated in step 905. These candidates are added to the list for FRUC except the ATMVP candidates added in step 906. With these steps up to 7 new predictors can be added.

Then the unilateral predictors are added to the list in step 907. The unilateral predictors are generated based on the motion interpolation at 4×4 block level for each reference frame. More details can be found in JVET-F1001. The process takes only some predictors among all motion inter-polated at 4×4 block level. If the Height (H) or the Width (W) of the block is greater than 4, two predictors can be added. So for a block of a size H×W, where both H and W are greater than 4, 2×2=4 predictors can be added. If H is equal to 4 and W larger than 4 the number of predictors is 1×2=2 predictors. For 4×4 block only 1 predictor is added.

Eventually, some neighboring predictors are added in a step 908. Yet maximum 2 predictors are added.

For each predictor added to the list it is checked that this predictor is not a duplicate predictor. Consequently, the list 909 contains only predictors with different values.

At the end of the process, the maximum number of predictors in the list 909 is summarized in the following table:

| Block size | Mode | Number of predictors for one list |
|---|---|---|
| 4 × 4 | Merge | 7 + 1 + 2 = 10 |
|  | FRUC |  |
|  | AMVP | 3 + 7 + 1 + 2 = 13 |
| 4 × 8 (or 4 × 8) | Merge | 7 + 2 + 2 = 11 |
|  | FRUC |  |
|  | AMVP | 3 + 7 + 2 + 2 = 14 |
| 8 × 8 (for all block sizes with H > 4 and W > 4) | Merge | 7 + 4 + 2 = 13 |
|  | FRUC |  |
|  | AMVP | 3 + 7 + 4 + 2 = 16 |

Figure 10:
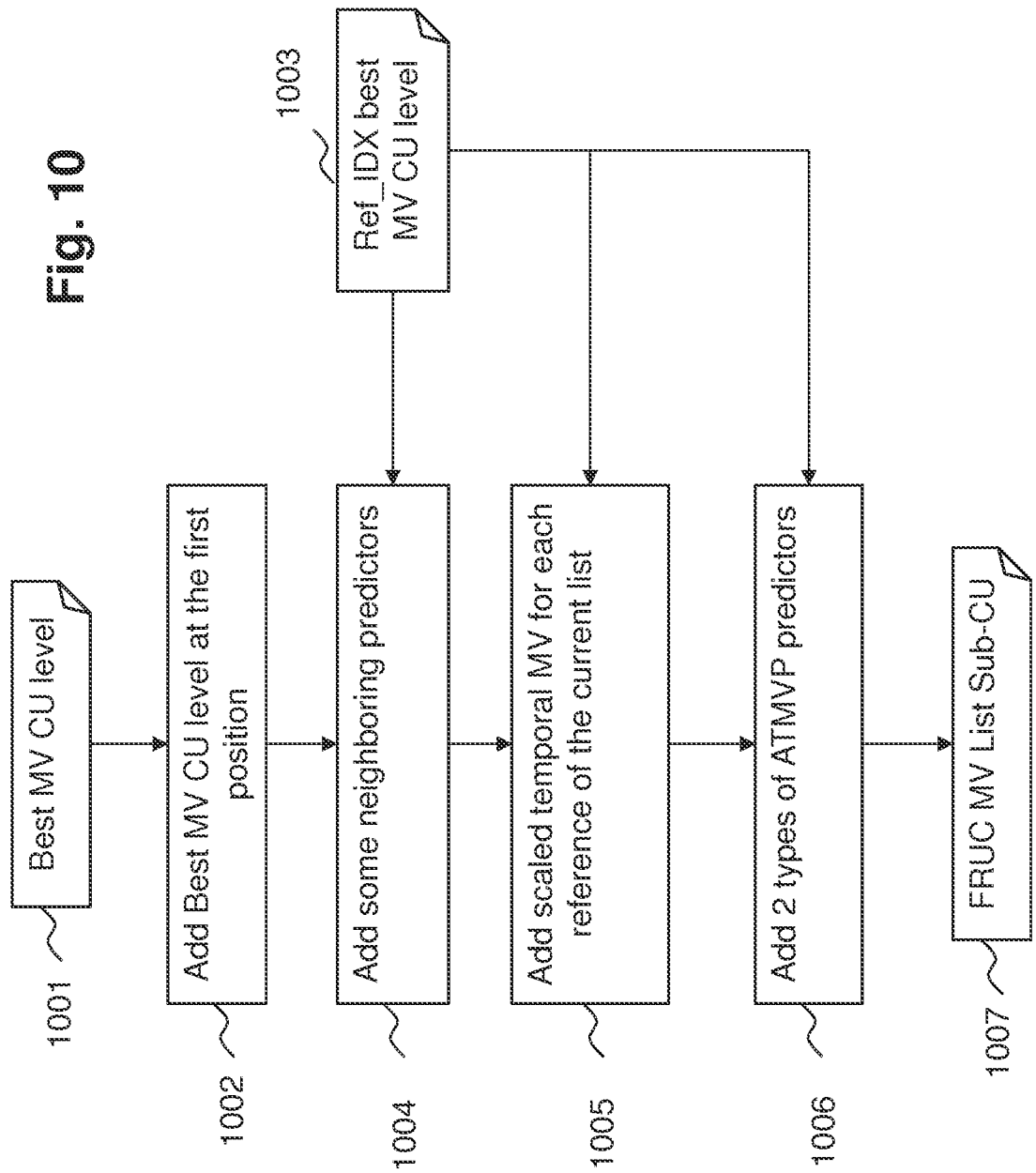
FIG. 10 illustrates the motion vector list derivation for the Sub-coding unit level.

FIG. 10 shows the motion vector list construction for sub-coding unit level for FRUC corresponding to step 821 in FIG. 8. This process is executed for each list L0 and L1.

First, in a step 1002, the best motion vector 1001 obtained at coding unit level is added to the list at the first position.

In a second time, in as step 1004, some neighboring motion vectors are added if they have the same index of reference frame and same list L0 or L1. In this process a maximum of 4 motion vectors are added. This step needs the index 1003 of the reference frame corresponding to the best motion vector at coding unit level.

Then all temporal motion vectors from each reference frame of the list are scaled to the reference frame of the best motion vector obtained at coding unit level and added to the list in a step 1005. If we consider that a list can contain 16 reference frames, 16 additional predictors can be added to this list.

Eventually, the ATMP predictors can be added to the list in a step 1006. 2 types of ATMVP predictor are added. But it exists a restriction: for 4×4 sub-coding unit only one vector for each type is added, namely 2 predictors. For larger sub-coding unit, 4 predictors can be added.

In the same way as coding unit level each predictor added to the list is not a duplicate predictor. Consequently, the list 1007 contains only predictors with different values. Please also note that this process is not applied for AMVP.

At the end of the process, the maximum number of predictors in the list 1007 is summarized in the following table:

| Block size Sub-coding unit level | Mode | Number of predictors for one list |
|---|---|---|
| 4 × 4 | Merge FRUC | 1 + 4 + 16 + 2 = 13 |
| 8 × 8 or higher | Merge FRUC | 1 + 4 + 16 + 8 = 19 |

For the worst-case decoding, the maximum number of motion vector tested for a 4×4 block corresponds to the maximum number of predictors at coding unit level, plus the maximum number of predictors at sub-coding unit level, multiplied by two as there may be two different lists. It results in a maximum of 52 predictors corresponding to the same number of block positions to be tested according to the rate distortion criteria.

This is very high compared to the decoding of block in HEVC where only 2 block positions are accessed for the decoding.

Figure 11:
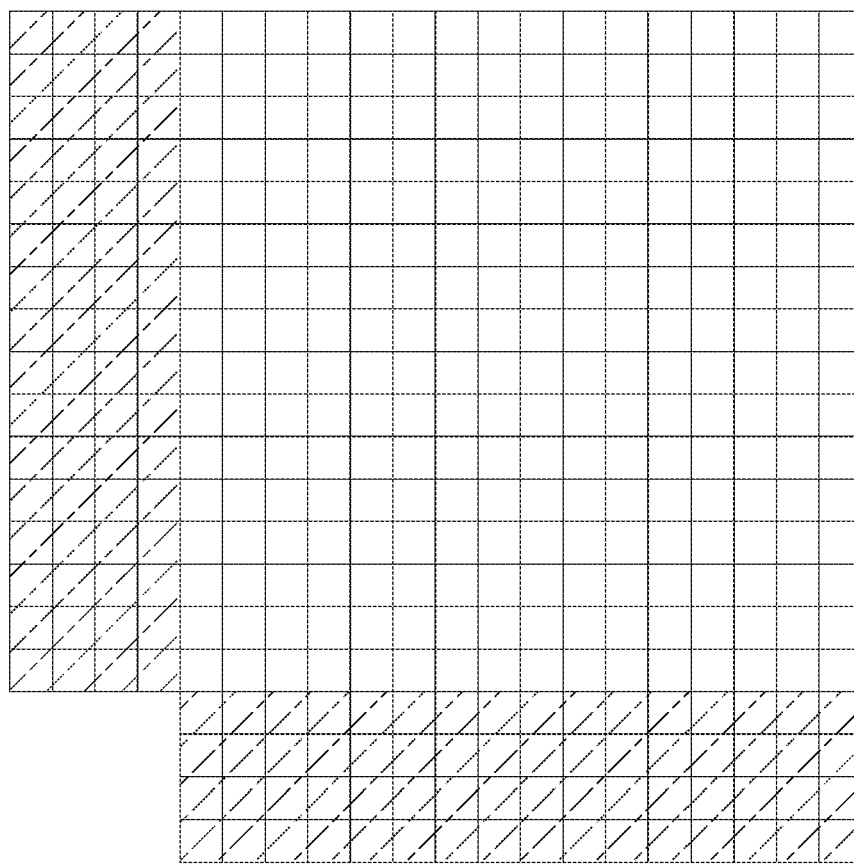
FIG. 11 illustrates the template around the the current block for the JEM template matching method.

For template FRUC matching mode, the template comprises 4 lines up to the block and 4 rows left to the block used to estimate the rate distortion cost as depicted in grey in FIG. 11. To evaluate the rate distortion for a motion vector predictor of the FRUC motion vector list, it is needed to access to the corresponding templates of the block referenced by the evaluated motion vector predictor.

Figure 12:
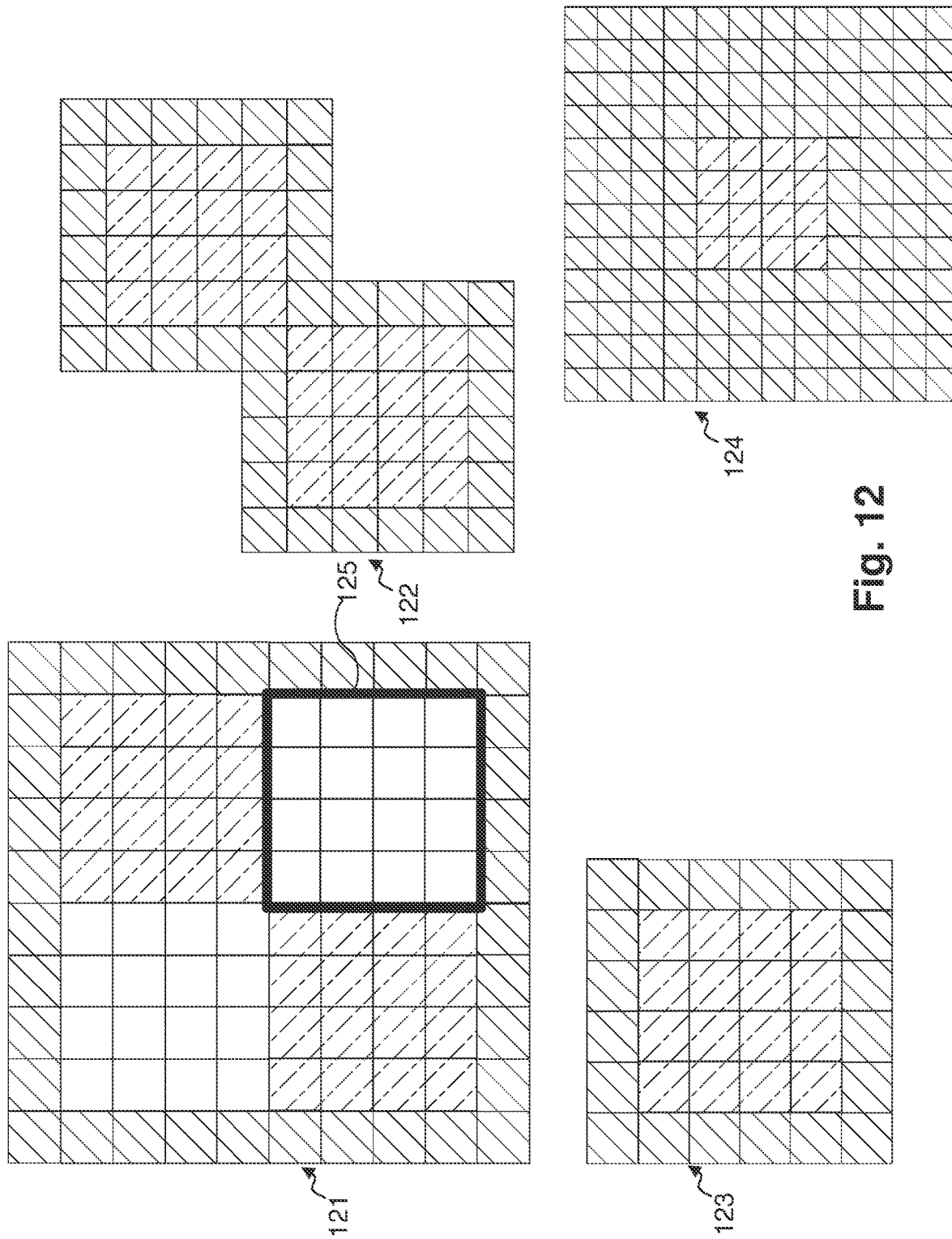
FIG. 12 illustrates the memory access for one block in a ¼ pel grid of pixels.

FIG. 12 shows some examples of block memory access needed for hardware implementation for a 4×4 block.

Diagram 121 illustrates the pixels that need to be accessed to evaluate a FRUC template. Considering the block 125 referenced by the evaluated motion vector, template matching needs to access to left and up blocks illustrated in grey. The pixels in the upleft block illustrated in white are also accessed because, for some implementation, it is less complexe to access only once to an higher block memory size than to 2 smaller blocks memory size. Moreover to be able de compute sub-pixel position and motion vector refinement it is needed to access to one more pixel around this block, illustrated as dashed pixels, to generate the bilinear interpolation of pixels. So, for a vector position for a 4×4 block it is needed to access to (4+4+2)×(4+4+2)=100 pixels by considering that it is needed to evaluate the motion vector refinement. Or (4+4+1)×(4+4+1)=81 pixels if we consider only the access for the motion vector list estimation. So for the evaluation of one vector 100/(4×4)=6.25 pixels for one pixel of the current block are accessed (if we consider also the motion vector refinement) and 81/(4×4)~=5 pixels for one pixel of the current block for motion vector list evaluation in step 812 of FIG. 8.

Yet it may be possible to access to lower number of pixels or pixels really needed as shown in the diagram 122 where only the pixels strictly needed for the evaluation are considered. But this needs a very specific hardware implementation to design such buffer.

Another possibility is to access to only the templates as represented in diagram 123. In that case, the Up block and the left block are accessed independently with 2 distinct memory accesses. In that case 5×5×2=50 pixels need to be accessed for motion vector list evaluation. And 6×6×2=72 pixels if we consider the additional motion vector refinement.

For bilateral FRUC matching mode, the template is the block referenced by the motion vector. So for one vector predictor in a list, 2 block positions are considered as illustrated by diagram 123 of FIG. 12. So if we consider only the motion vector list evaluation 5×5×2=50 pixels need to be accessed and 6×6×2=72 pixels if we consider the additional motion vector refinement.

For the traditional motion compensation, with bi-prediction, 2 block positions need to be accessed one for each list. As the DCTIF is a longer filter than the bilinear, more pixels need to be accessed as depicted in diagram 124. In that case for a 4×4 block, (4+7)×(4+7)×2=242 pixels need to be accessed for a 4×4 block.

The following table gives some numbers on the memory accessed for the worst-case complexity of FRUC Merge mode for each matching mode and for the traditional Merge mode for 4×4 block. As reported FRUC Merge mode largely increase the worst-case memory access needed at decoder side compared to the traditional motion compensation.

|  | FRUC template matching (diag 121) | FRUC template matching (diag 123) | FRUC bilateral matching | Classical Merge mode |
| --- | --- | --- | --- | --- |
| Step 812 | 10*81*2 = 1620 | 10*50*2 = 1000 | 10*25*2 = 500 | |
| Step 814 | 100*2 = 200 | 72*2 = 144 | 36*2 = 72 | |
| Step 821 | 13*81*2 = 2106 | 13*50*2 = 1300 | 13*50 = 650 | |
| Step 824 | 100*2 = 200 | 72*2 = 144 | 36*2 = 72 | |
| Motion | 242 | 242 | 242 | 242 |

-continued

|  | FRUC template matching (diag 121) | FRUC template matching (diag 123) | FRUC bilateral matching | Classical Merge mode |
| --- | --- | --- | --- | --- |
| compensation | | | | |
| SUM | 4368 | 2830 | 1536 | 242 |
| Per block pixel | 273 | ~177 | ~96 | ~15 |

The motion vector refinement of steps 814 and 824 in FIG. 8 increases the accuracy of the motion vector predictor by an additional search around the best predictor identified (813 or 823).

Figure 13:
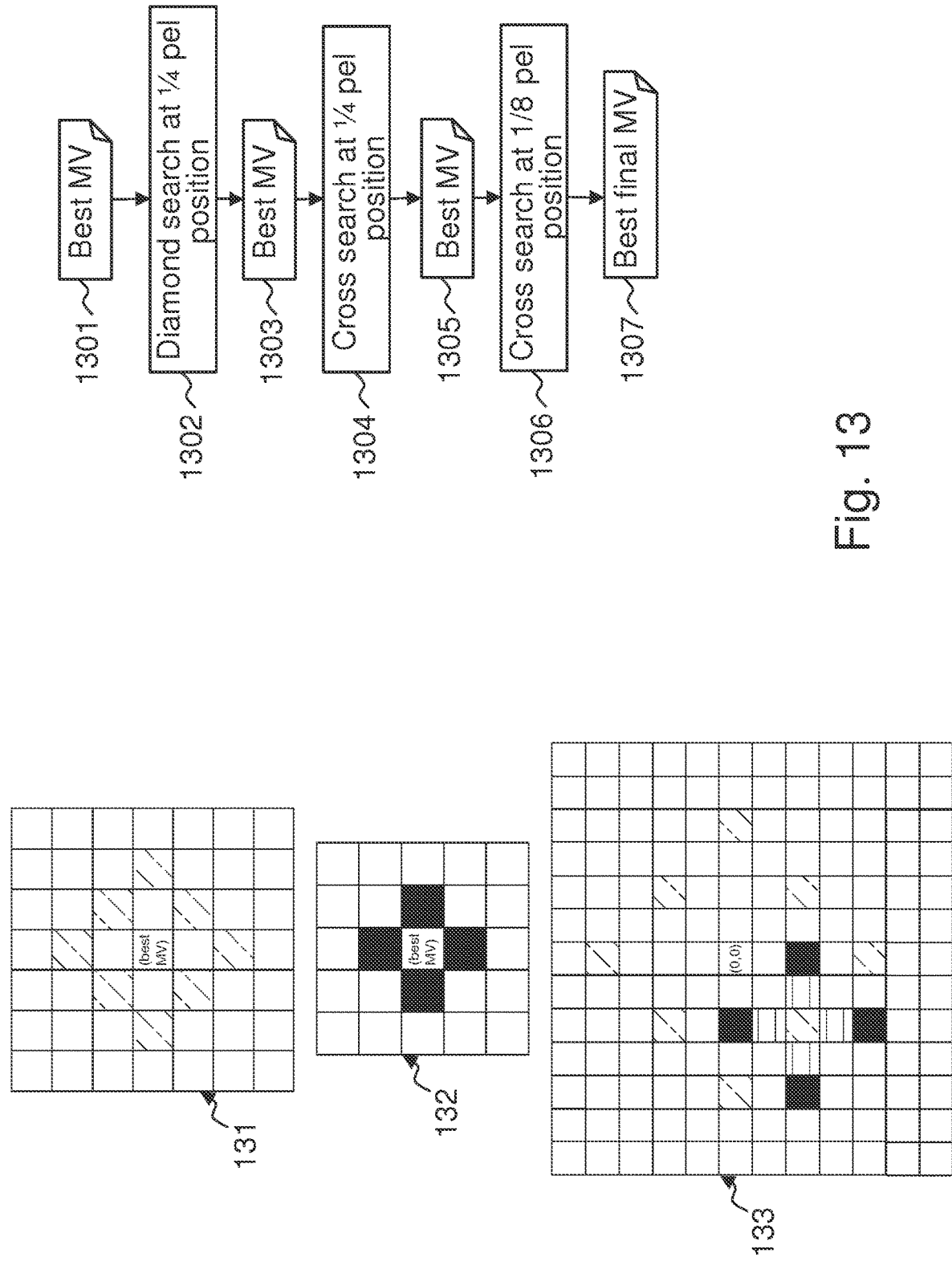
FIG. 13 illustrates the motion vector refinement.

FIG. 13 illustrates this motion vector refinement.

The method takes as input the best motion vector predictor 1301 identified in the list (812 or 822).

In a step 1302, a diamond search is applied at a resolution corresponding to ¼ pixel positions. This diamond search is illustrated by diagram 131, at the ¼ pixel resolution, centered on the best vector motion. This step results in a new best motion vector 1303 at the ¼ pixel resolution.

The best obtained motion vector position 1303 of this diamond search becomes the center of a cross search at resolution ¼ pixel in a step 1304. This cross search is illustrated by diagram 132, at the ¼ pixel resolution, centered on the best motion vector 1303. This step results in a new best motion vector 1305 at the ¼ pixel resolution.

The new best motion vector position 1305 obtained with this search step 1304 becomes the center for a cross-search at resolution ⅛ pixel in step 1306. This step results in a new best motion vector 1307 at ⅛ pixel resolution. Diagram 133 illustrates, at the ⅛ resolution, these three search steps with all the positions tested.

Figure 14:
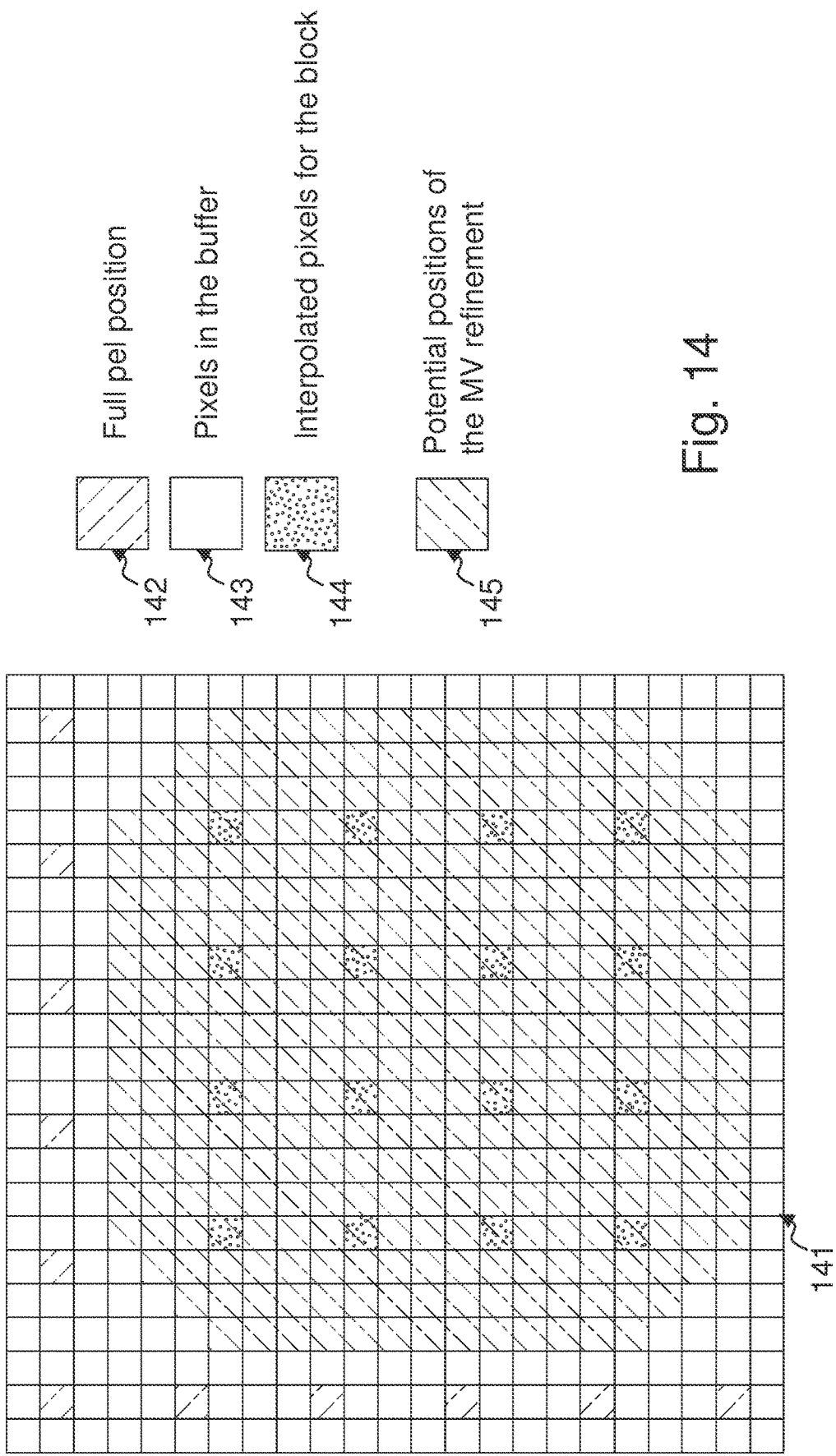
FIG. 14 illustrates the pixels used for the motion vector refinement in a ¼ pixel grid of pixels.

FIG. 14 represents a 4×4 block in a ¼$^{th}$ sub-pixel grid.

On this figure in the block 141, orange pixels 142 represent the pixel position at pixel resolution. The red pixels 143 are the pixels in the buffer. The blue pixels 144 represent interpolated pixels of the bloc referenced by the motion vector. The grey positions 145 represent all potential positions of the refined motion vector.

As the interpolated block referenced by the motion vector as a sub-pixel position, the size of the block of pixels put in the buffer for the interpolation is a block of (4+1)×(4+1)=25 pixels at pixel resolution. For the motion vector refinement (steps 814 or 824), the possible sub-pixel positions are represented in grey.

The Hardware design of a video decoder must consider the worst-case complexity. Otherwise it can't decode in time when this worst case occurs. The FRUC method increases significantly the memory access worst-case. But the simple method to decrease the memory access worst-case, consisting in preventing the use of 4×4, 4×8 or 8×4 blocks, decreases significantly the coding efficiency.

The aim of the invention is to reduce the worst-case complexity regarding memory access with reduced degradation of the coding efficiency. Several embodiments to solve this problem will now be described.

Figure 15:
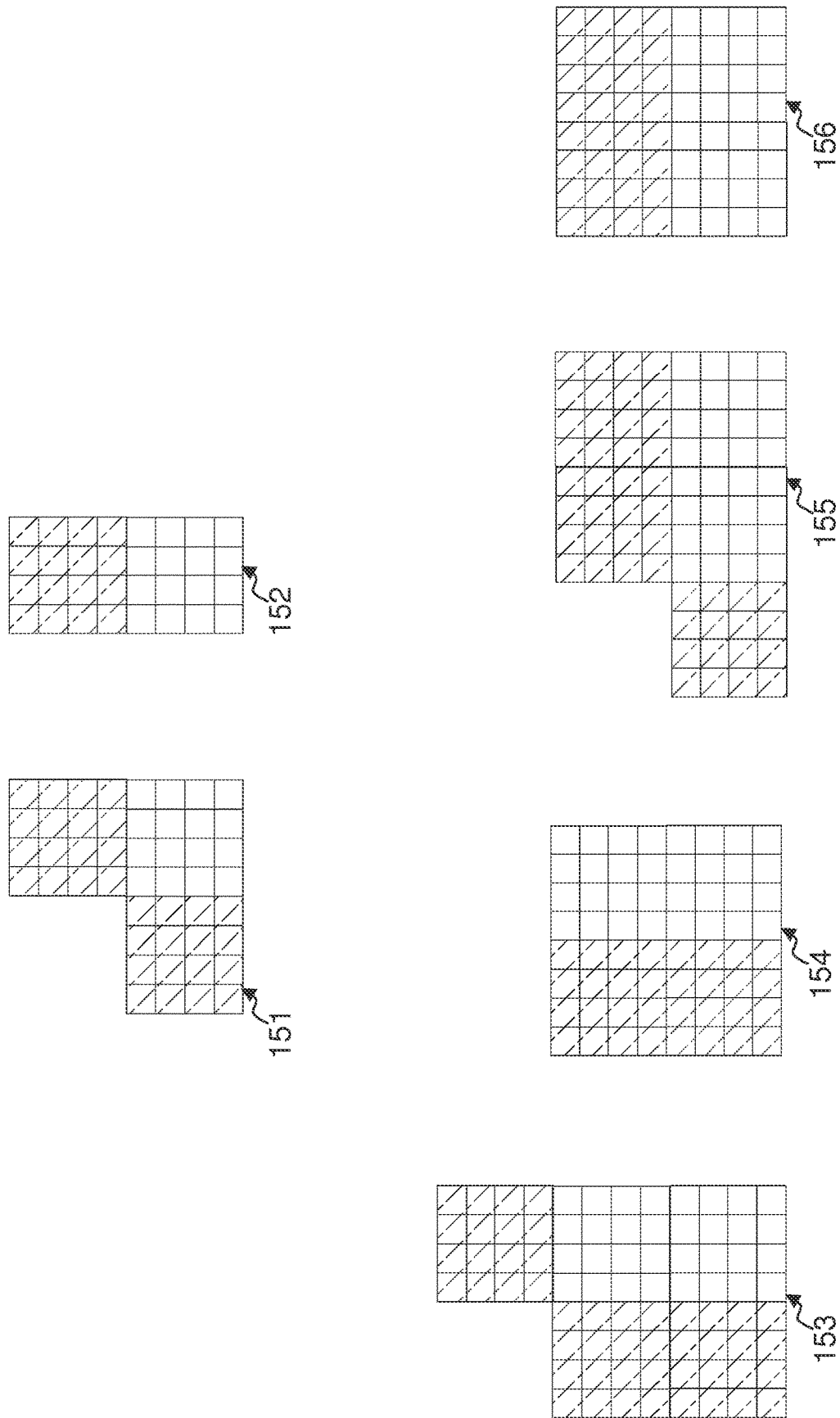
FIG. 15 illustrates exemplary templates used in one embodiment de the invention.

In a first embodiment of the invention, illustrated by FIG. 15, the template shape is reduced to reduce the memory access. The white pixels represent the considered block of pixels while the grey ones represent the template used to evaluate template matching of the FRUC merge mode. Diagram 151 illustrates the prior art while diagrams 152 to 156 illustrates different variant or different cases of the first embodiment.

Diagram 151 illustrates the prior art template for a 4×4 block where the up 4×4 block and the left 4×4 block are used to constitute the template.

With this embodiment, only the up block is selected to constitute the template when the block is a 4×4 block as illustrated by diagram 152. If the up 4×4 block does not exist, the template can be constituted by the left block similarly. In this embodiment, the template size doesn't exceed the size of the current block. Moreover, as only one 4×4 block need to be stored in the memory for template the memory access worst case for 4×4 block is largely reduced from a buffer of 81 pixels in the case illustrated by diagram 121 of FIGS. 12 to (4+1)×(4+1)=25 pixels for this embodiment.

When this embodiment is allowed for 4×4 blocks, the 8×4 and 4×8 blocks become the worst case. Using the same idea than the one used for the 4×4 blocks, a template like the one illustrated in diagram 154 may be used for 4×8 blocks instead of the templates illustrated in diagram 153. Similarly, a template like the one illustrated in diagram 156 may be used for 8×4 Blocks instead of the templates illustrated in diagram 155. The template is reduced to the left template for 4×8 blocks as illustrated by diagram 154 and to the up block as illustrated by diagram 156 for the 8×4 blocks. In the same way as for 4×4 blocks, the template size doesn't exceed the size of the current block. As for 4×4 blocks, if the template left for 4×8 or up for 8×4 blocks doesn't exist, it is possible to switch to the other templates, respectively the up and left 4×4 block.

This embodiment can be considered as a restriction where a template can't exceed the size of the current block.

The results on memory worst case of this embodiment is summarized in the following table.

|  | FRUC template matching |
|---|---|
| Step 812 | 10*25*2 = 500 |
| Step 814 | 36*2 = 72 |
| Step 821 | 13*25*2 = 650 |
| Step 824 | 100*2 = 72 |
| Motion compensation | 242 |
| SUM | 1536 |
| Per pixel | 96 |

So, with this embodiment the worst-case memory access is reduced by 2.5. Compared to the obvious solution where all 4×4, 8×4 and 4×8 blocks are avoided which leads to the same worst-case reduction, the proposed embodiment gives a better coding efficiency.

To limit the memory access, a solution adopted in another embodiment of the invention is to limit the number of predictors generated in the predictor list in steps 811 and 821 of FIG. 8.

In one embodiment, the number of predictors in the list at coding unit level generated by step 811 and sub-coding unit level generated by step 821 is limited to a number N lower than the maximum number of candidates used in the prior art. The predictor list is generated as usual, the limitation is obtained by removing some predictors in the generated list. The actual removed predictors in the list changes according to the mode or the matching type.

Figure 16:
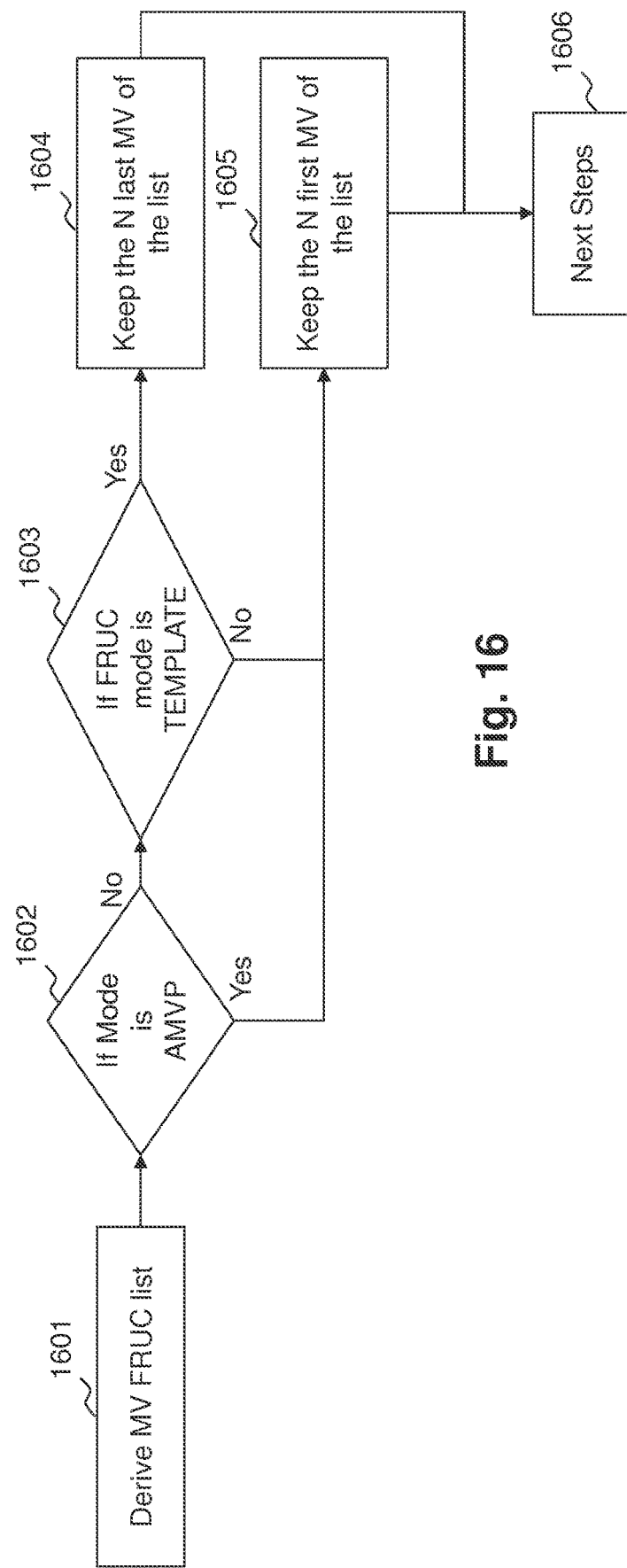
FIG. 16 illustrates the pruning process of the motion vector list in one embodiment de the invention.

FIG. 16 illustrates the proposed process. First, the FRUC motion vector list is derived in a step 1601 as it is in the prior art.

If the mode is AMVP, tested in step 1602, the N first motion vectors of the list are kept and the following ones are removed in a step 1605.

If the mode is not AMVP and the FRUC matching type, tested in step 1603, is the template matching, the N last motion vectors of the list are kept in a step 1604, the first ones being removed.

Otherwise, the N first motion vectors of the list are kept and the following ones are removed in the step 1605.

Please note that this embodiment can be adapted. In particular one of the testing steps 1603 or 1602 can be omitted. In an alternative embodiment, the presence of each test is made dependent on the coding unit level or sub-coding unit level process. For example, the test 1602 is applied only at CU level and the test 1603 is applied only at sub-Cu level.

This embodiment is efficient because it provides a complementarity to the classical derivation of the Merge mode candidates. This is particularly interesting for the template matching FRUC mode. For AMVP, it is important to keep the first predictors because they are the predictors of the AMVP motion vector predictors list. And the current usage of FRUC in AMVP mode is a kind of determination of the most probable predictor. This is different for the FRUC Merge mode. So in one embodiment, if it exists a AMVP FRUC mode competing to the classical AMVP mode, the N last predictors are kept in the list if the AMVP mode is selected while the N first motion vector predictors for the AMVP FRUC mode.

With this embodiment, the same process can be used to derive the motion vector list which can be interesting for hardware implementation, but this can be not very efficient when the list of motion vector is very long. In another embodiment, the N first motion vector are always kept. The motion vector list derivation process may be changed according to some parameters to directly generate a vector list limited to N vectors. For example, these parameters may be the Mode and the matching type as the parameters used in the limitation process of FIG. 16.

Figure 17:
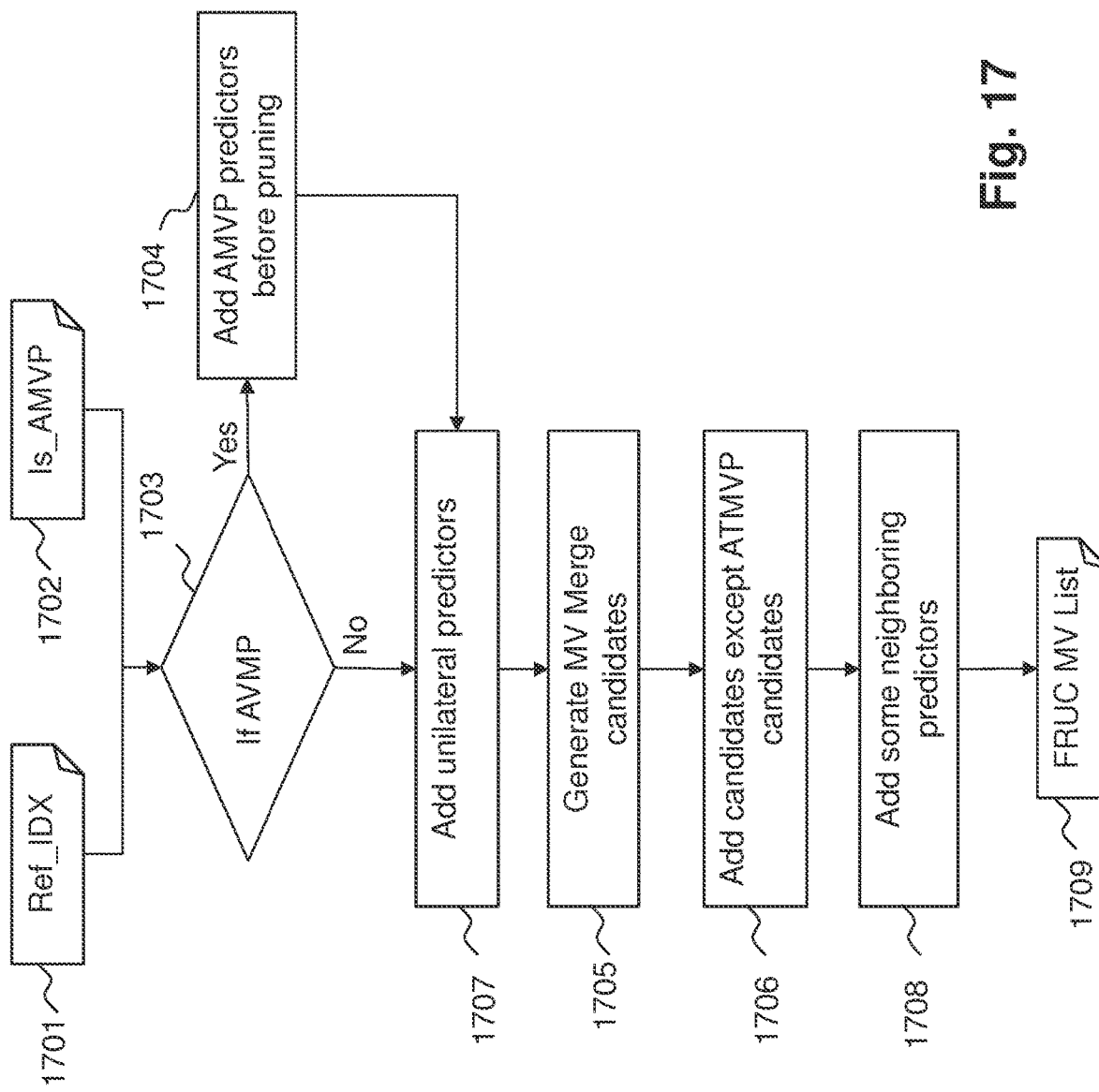
FIG. 17 illustrates the motion vector list derivation for the coding unit level in one embodiment de the invention.
Figure 18:
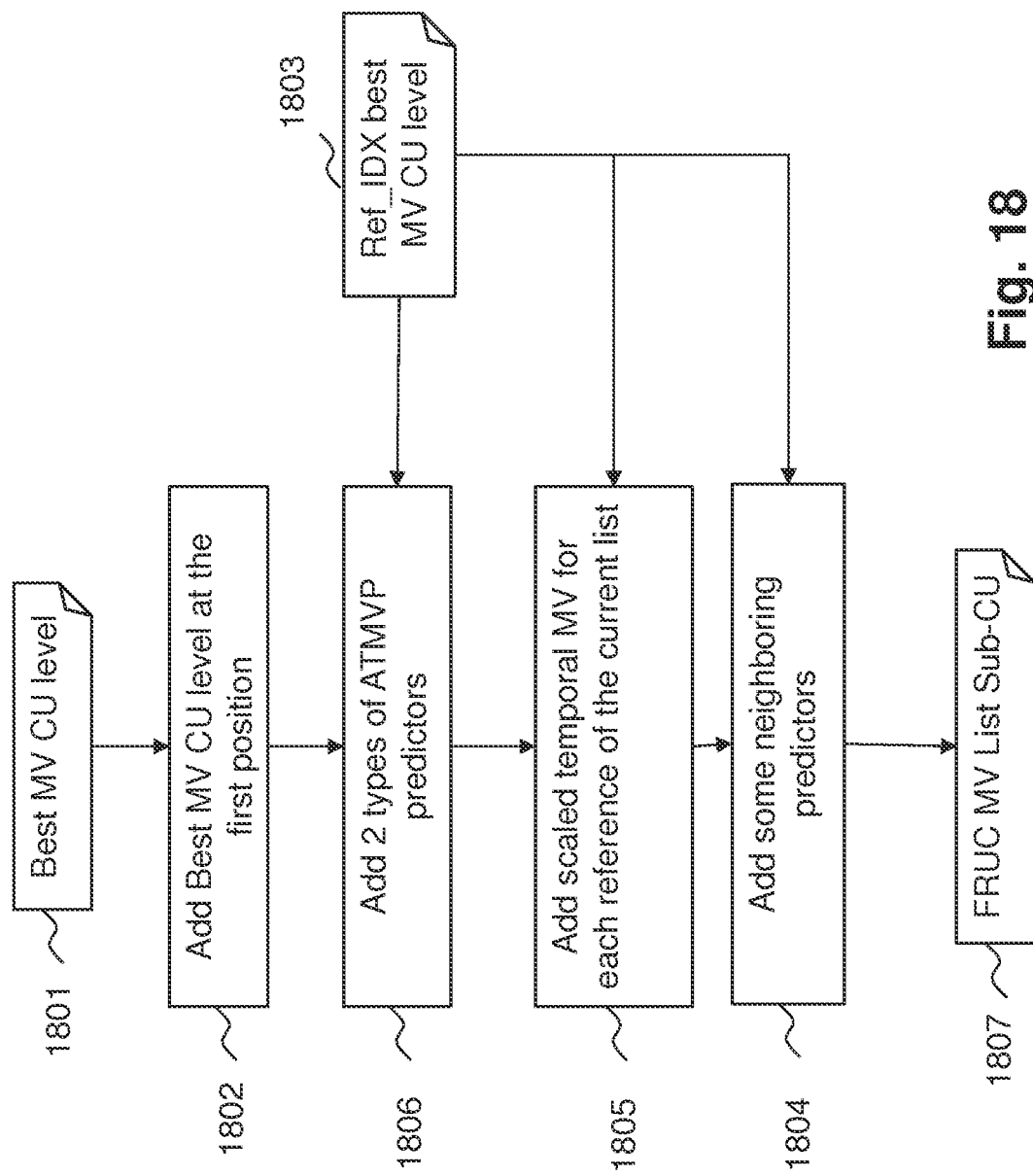
FIG. 18 illustrates the motion vector list derivation for the Sub-coding unit level in one embodiment de the invention.

FIG. 17 and FIG. 18 illustrates such embodiments.

Compared to the corresponding process illustrated in FIG. 9, the vector list derivation method at coding unit level illustrated by FIG. 17 changes the order of insertion of vectors in the list. The unilateral predictors are evaluated and therefore inserted first in a step 1707. Next, the Merge predictors are inserted in steps 1705 and 1706.

Compared to the corresponding process illustrated in FIG. 10, the vector list derivation method at sub-coding unit level illustrated by FIG. 18 also changes the order of insertion of vectors in the list. The 2 types of ATMVP predictors are inserted in a step 1806 before the insertion of the scaled temporal predictor in step 1805 and before the neighboring predictors inserted in step 1804.

In another and/or additional embodiment, the scaled motion vector temporal predictors are generated in the inverse order. Indeed, they are added from the reference frame with the highest index to the lowest reference frame index. When only the N first predictors are kept in memory it is preferable to use the scaled temporal predictors with the lowest reference frame indexes. Indeed, generally the lowest reference frame indexes represent the closest reference frames consequently the motion should be more relevant. In an alternative embodiment the scaled temporal predictor are added from the closest reference frame to the farthest reference frame.

When this embodiment is applied it reduces significantly the worst-case as described in the following table for ab4×4 blocks and for N=3 predictors for coding unit and Sub-coding unit level:

|  | FRUC template matching (diagram 121) | FRUC template matching (diagram 123) | FRUC bilateral matching | Classical Merge mode |
| --- | --- | --- | --- | --- |
| Step 812 | 3*81*2 = 486 | 3*50*2 = 300 | 3*25 *2 = 150 |  |
| Step 814 | 100*2 = 200 | 72*2 = 144 | 36*2 = 72 |  |
| Step 821 | 3*81*2 = 486 | 3*50*2 = 300 | 3*25 *2 = 150 |  |
| Step 824 | 100*2 = 200 | 72*2 = 144 | 36*2 = 72 |  |
| Motion compensation | 242 | 242 | 242 | 242 |
| SUM | 1614 | 1130 | 686 | 242 |
| Per pixel | ~100 | ~71 | ~43 | ~15 |

It is worth noting that the worst-case for both template and bilateral matching are reduced.

In the preferred embodiment, the number of predictors for each predictors set is set to N equal to 3.

In one additional embodiment when the number of predictors in the list doesn't reach the size N some virtual predictors are added. Some known virtual predictors are the offset predictors. An offset predictor is obtained by adding an offset value to the horizontal and/or to the vertical vector component of another predictor, generally to the first predictor in the list.

In one embodiment, the motion vector list for Merge and Merge FRUC are generated in a different order. The Merge candidates list has been set to obtain the best coding efficiency in HEVC. Consequently, it can be considered that the motion vector candidates are ordered so that the most probable predictor is set at the first position of the list. The Merge FRUC mode is mostly selected where the motion information is very predictable. So where the first predictor of the Merge list is generally selected with HEVC. When the Merge FRUC Mode is enabled, the first Merge candidate is less selected. So it can be interesting to have a specific list with a different order for the classical Merge derivation which takes into account that the Merge FRUC is able to find often the most probable mode. Please note that this embodiment improves the coding efficiency but not necessarily the worst-case issue. This embodiment doesn't require a fixed motion vector list size.

Figure 19:
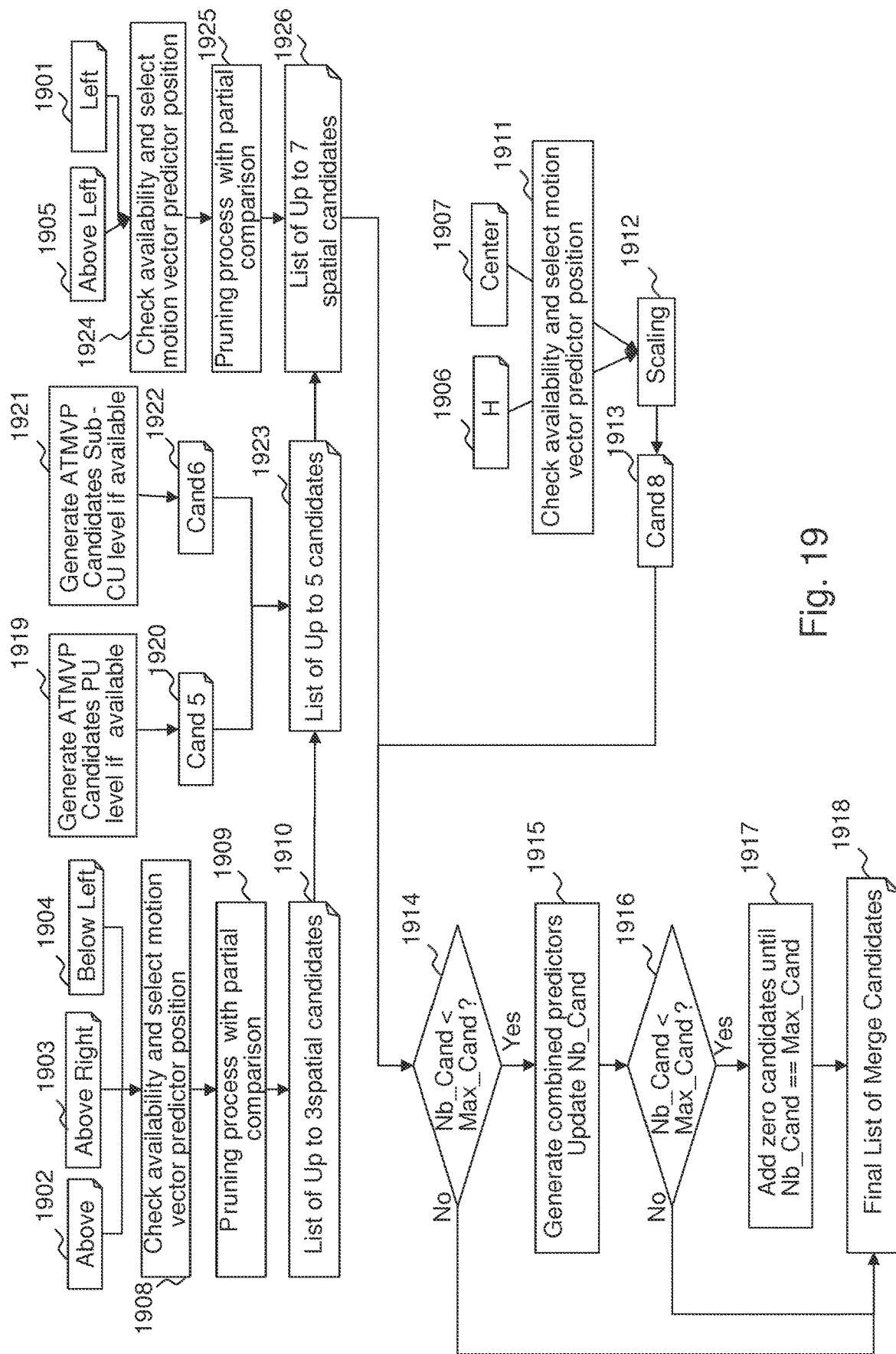
FIG. 19 illustrates the derivation of the Merge mode candidates in one embodiment de the invention.

FIG. 19 illustrates this embodiment, it corresponds to a variant of the motion vector derivation process illustrated by FIG. 4. In that case, the Left predictor 1901 evaluation has been displaced to be evaluated after the below left 1905. Its evaluation is therefore added at the end of the spatial list just before the temporal predictor.

Figure 20:
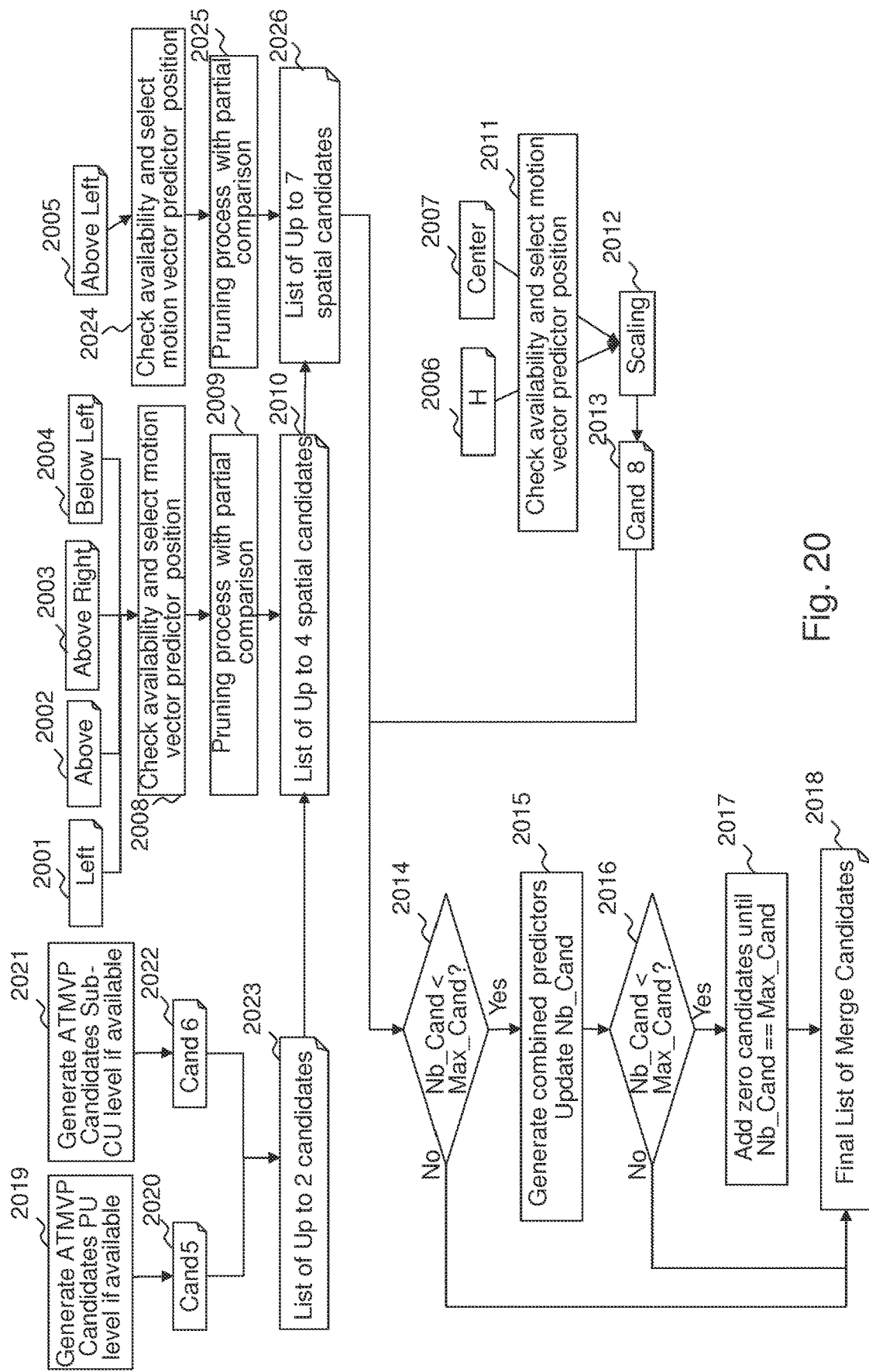
FIG. 20 illustrates the derivation of the Merge mode candidates in one embodiment de the invention.

FIG. 20 illustrates another possibility of this embodiment. In that case, when compared to the motion vector derivation process illustrated by FIG. 4, the evaluation of ATMVP candidates 2019 and 2021 have been displaced to occur first in the derivation process. Consequently, these predictors, which are not present in the derivation of the Merge FRUC mode in step 906 of FIG. 9, have the first positions in the list. So they have more chance to be selected at the first position. So these candidates not present in the FRUC merge list have a better complementarity to the merge FRUC, with lower bits to encode their indexes.

In another alternative embodiment, all the candidates evaluated before the temporal are evaluated in the reverse order. The typical evaluation of spatial predictors becomes: above left, ATMVP at coding unit level, ATMVP Sub-coding unit level, below left, above right, above and left. Of course, this embodiment can be adapted if it exists an AMVP FRUC mode.

The use of a new motion vector list for the sub-coding unit derivation process generates memory access of block positions for the worst-case. So it is preferable to not build a new list of motion information at the sub-coding unit level.

Figure 21:
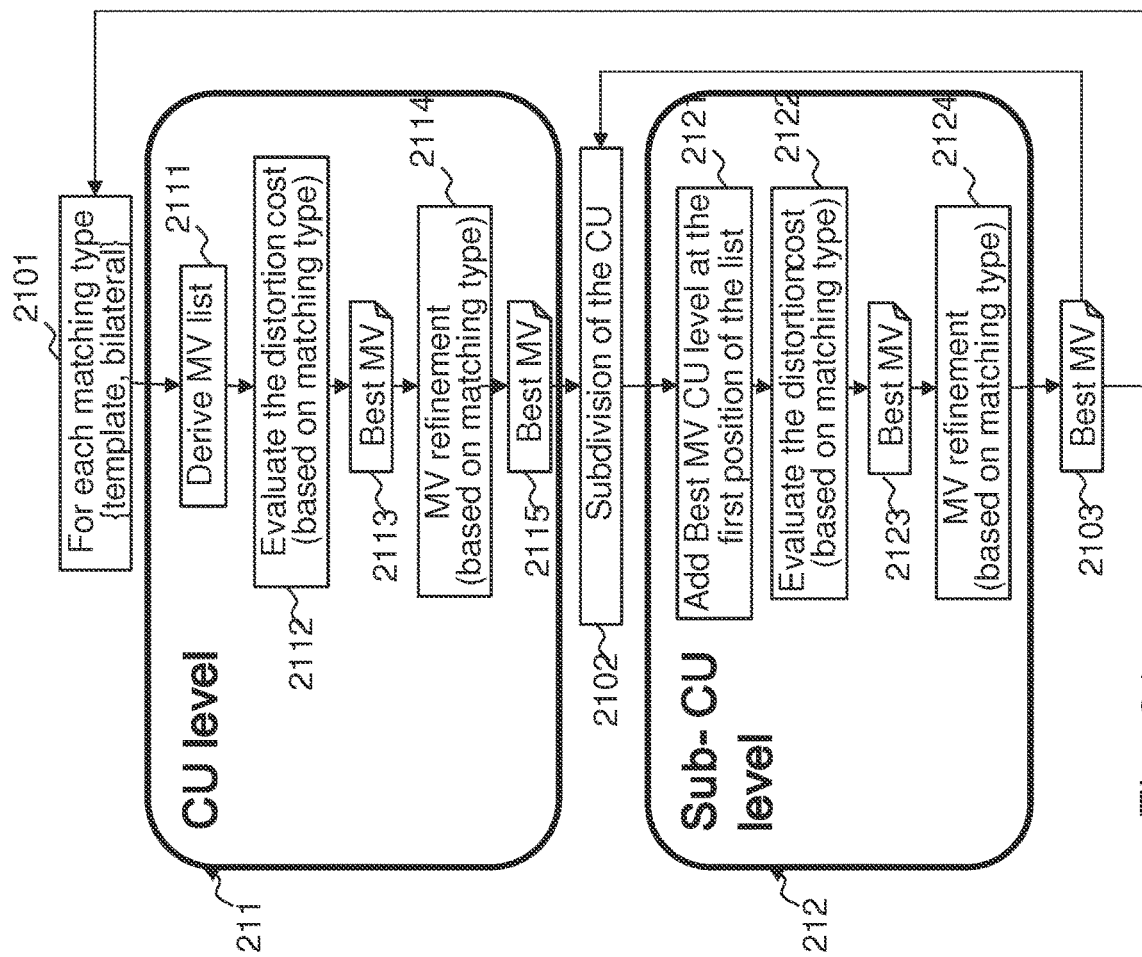
FIG. 21 illustrates the Merge FRUC mode derivation at coding unit and Sub-coding unit levels in one embodiment de the invention.

FIG. 21 illustrates this embodiment in relation with FIG. 8. In that case, the module 2121, corresponding to module 821 in FIG. 8, consists only in the inclusion of the best motion vector obtained at coding unit level at the first position of the motion vector list. But no new motion vector is derived compared to the coding unit level case. Therefore, only the best motion vector at coding unit level is evaluated for each sub-coding unit. The advantage of this embodiment is a small coding efficiency impact for a significant worst-case reduction in memory access. Indeed, the step 2121 doesn't need new memory access compared to step 821.

When this embodiment is combined with the previous one, and when the best motion vector obtained at the coding unit level has been changed by the motion vector refinement, it is required to remove one predictor to not increase the number of predictors and keep the number of predictors limited to N. Indeed the MV refinement 2114 or 814 could generate a new vectors compared to the list 2111 So it is need to remove one to have the same amount of vectors.

In one embodiment, this restriction is applied only for small block sizes (CU sizes), typically 4×4, 4×8 and 8×4 blocks, to reduce the memory access in the worst-case and not to decrease the coding efficiency for other coding unit sizes.

The following table gives some numbers on the memory accessed for the worst-case complexity of FRUC Merge mode for each matching mode and for the traditional Merge mode for 4×4 block when this embodiment is enabled:

|  | FRUC template matching 121 | FRUC template matching 123 | FRUC bilateral matching | Classical Merge mode |
| --- | --- | --- | --- | --- |
| Step 812 | 10*25*2 = 500 | 10*50*2 = 1000 | 10*25*2 = 500 |  |
| Step 814 | 36*2 = 72 | 72*2 = 144 | 36*2 = 72 |  |
| ~~Step 821~~ | ~~13*25*2 = 650~~ | ~~13*50*2=1300~~ | ~~13*50=650~~ |  |
| Step 824 | 100*2 = 72 | 72*2 =144 | 36*2 = 72 |  |
| Motion compensation | 242 | 242 | 242 | 242 |
| SUM | 1536 | 1530 | 886 | 242 |
| Per pixel | 96 | ~96 | ~56 | ~15 |

Refinement of motion vector best candidate as illustrated by FIG. 14 generate additional memory accesses. In a further embodiment, the potential positions of the motion vector refinement is restricted to pixel already in the buffer.

Figure 22:
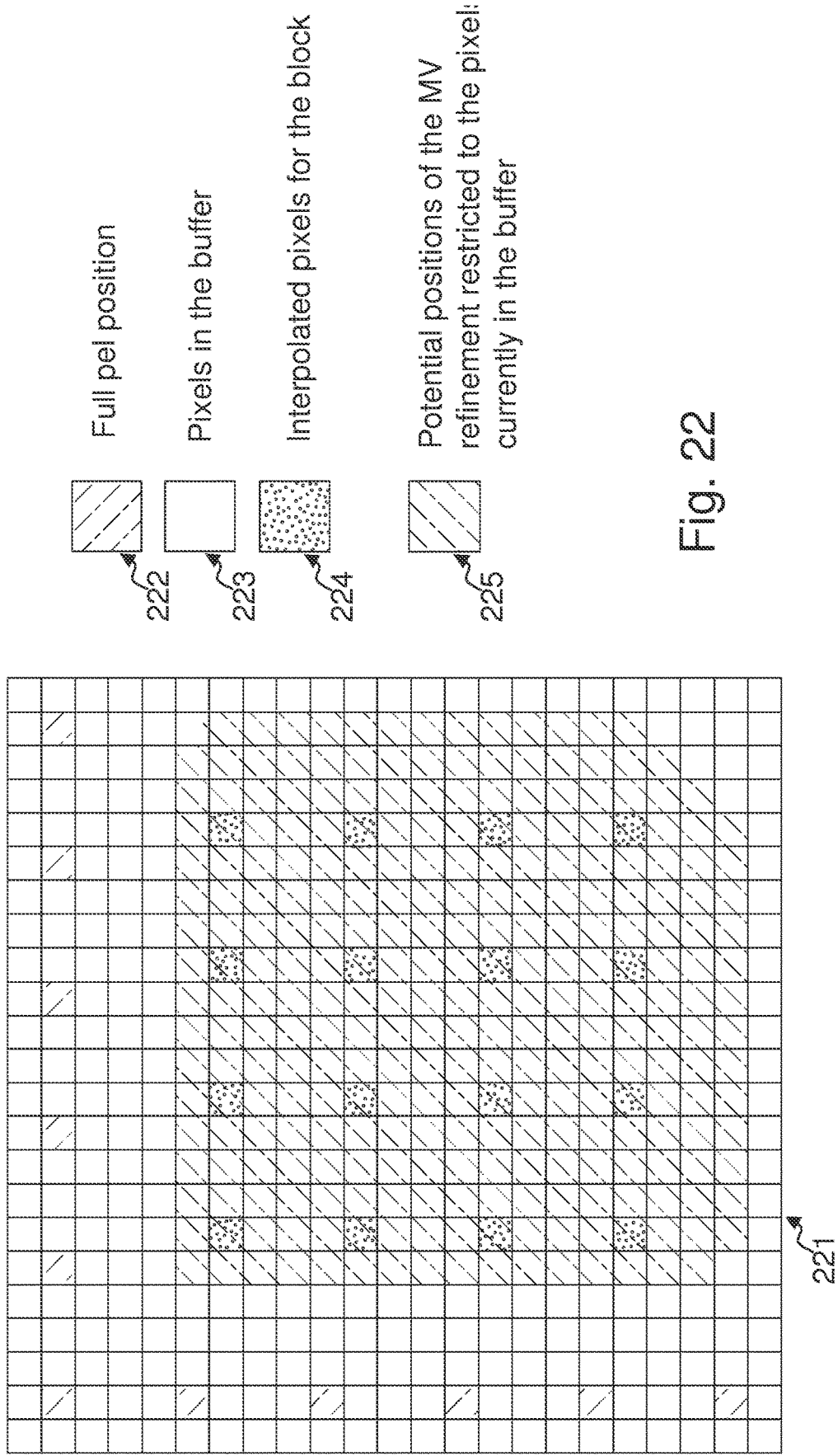
FIG. 22 illustrates the pixels used for the motion vector refinement in a grid of pixels for one embodiment de the invention.

FIG. 22 illustrates this embodiment. This figure is based on FIG. 14. Compared to FIG. 14, with this embodiment, the potential positions of the motion vector refinement is restricted to the pixels in the buffer 225. It means that, it is not authorized to access to new pixel position than those which where accessed for the templates of the best motion vector 815. Of course, according to the implementation, the buffer may contain different pixels. So in this embodiment the motion vector is restricted to use only the pixels which are required for the bilinear interpolation of the initial motion vector position.

To identify that a motion vector position is outside the buffer, the following condition can be used:

if((mvCandX>>mvRes!=mvCurCenterX>>mvRes)
   OR
   ((mvCandY>>mvRes!=mvCurCenterX>>mvRes))

where (mvCandX, mvCandY) is the motion vector tested position, and (mvCurCenterX, mvCurCenterY) is the motion vector of the initial block or the initial position of the previous refinement step. ">>" is the right shift operator. And mvRes represents the number of bits of the current sub-pixel resolution. For example, when the current resolution is $1/16^{th}$-pel, mvRes is equal to 4.

Moreover it is required to consider the search positions which point to the full pixel position inside the buffer. So the first condition becomes:

if(((mvCandX>>mvRes!=mvCurCenterX>>mvRes)
   AND (mvCandX %16!=0))

OR ((mvCandY>>mvRes!=mvCurCenterX>>mvRes)
   AND (mvCandY %16!=0)))

where "%" is the modulo operator.

The number 16 can be changed if the maximum sub-pixel resolution is not the $16^{th}$ sub-pixel.

For the particular case where the mvCurCenterX or mvCurCenterY are in a full-pixel resolution, it is needed to determine if the additional line buffer is on left or on the right when mvCurCenterX %16 is equal to 0 or above or below when mvCurCenterY %16. Indeed, if the previous condition is used of block on full pixel resolution, no refinement is possible.

So when mvCurCenterX %16 is equal to 0 the following condition is added to check if the tested position need only the left line and not the right line:

((mvCandX>>mvRes)-(mvCurCenterX>>mvRes))<0

Figure 23:
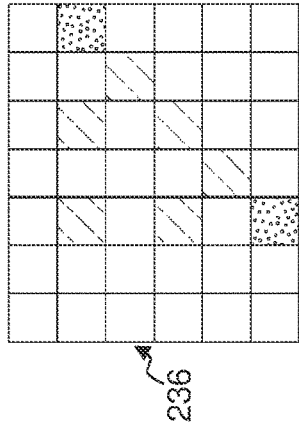
FIG. 23 illustrates the pixels used for the motion vector refinement in grids of ¼-pixel resolution compared to the examples of FIG. 22 for one embodiments de the invention.
Figure 23:
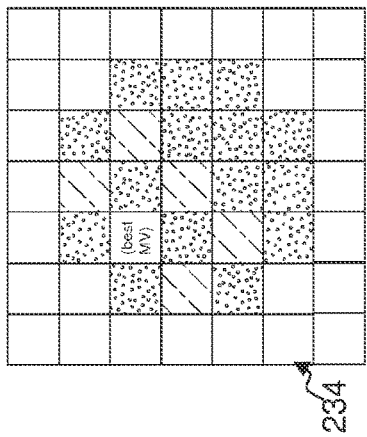
Figure 23:
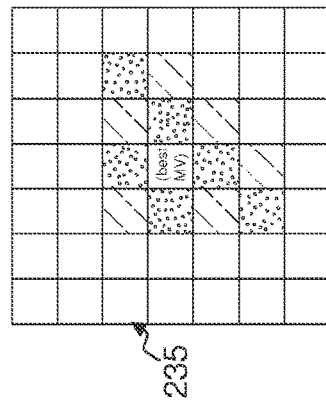
Figure 23:
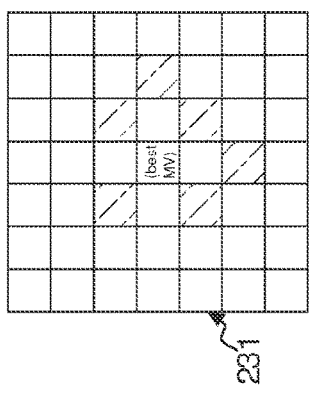
Figure 23:
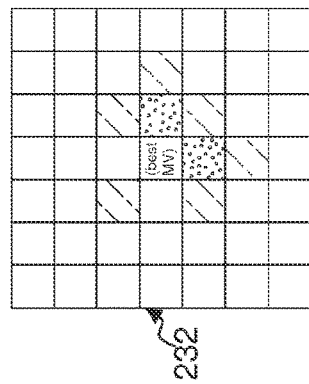
Figure 23:
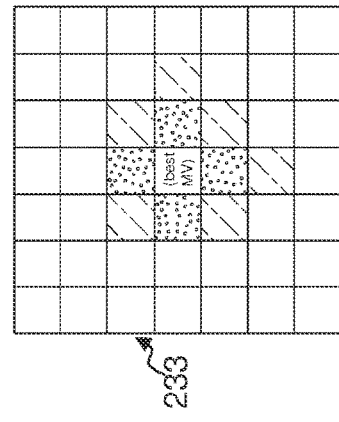

FIG. 23 illustrates different exemplary search diagram used in this embodiment.

Diagram 231 illustrates the diamond search pattern positions restricted with this embodiment compared to the diamond search pattern positions illustrated by diagram 131 for the example of FIG. 22.

The advantage of this embodiment is that no new memory access are required in the execution of the steps 814 and 824 of FIG. 8.

As this restriction reduces the number of tested positions it slightly degrades the coding efficiency. To reduce the degradation, some positions can be added to replace the avoided positions.

One possible method to generate these positions is to add the inverse offset divided by 2 to the center position. One possible formula to obtain this value for the new mvCandX can be:

mvCandX=mvCurCenterX-(mvCandX-mvCurCenterX)/2;

Diagram 232 shows the results for diamond search for this embodiment. Two new pixel positions are added compared to diagram 231.

One another possible method to generate positions is to add all positions at quarter-pixel position inside the diamond as depicted in diagram 233 or all positions at quarter-pixel inside the possible memory buffer 234. In that case, the 3 steps of motion vector refinement 1302, 1304 and 1306 can be replaced by these embodiments. Please note also that the full pixel position represented at the corners are also tested as illustrated by diagram 234.

Another possible method to generate positions generates the additional positions represented in diagram 235 compared to diagram 231.

Yet another possible method to generate positions is to set the mvCandX or mvCandY equal to the maximum full pixel position of the buffer when the pointed block is outside the buffer as depicted in diagram 236.

In an additional embodiment, the motion vector refinement is applied for each motion vector predictor of the list and the best one is selected. Indeed with this embodiment, it is not needed to access to new pixels for the motion vector refinement process. This additional embodiment gives better coding efficiency than the current motion vector FRUC derivation.

In one embodiment, the motion vector refinement is applied to other coding modes with motion vectors and the restriction on the MV refinement is applied. This embodiment improves the coding efficiency without any new memory access if for example the bilateral matching is used.

All the possible combinations of the described embodiments are possible.

The following table gives some numbers on the worst-case memory access complexity of FRUC Merge mode for each matching mode and for the traditional Merge mode for 4×4 block when all proposed worst-case reductions methods are enabled.

|  | FRUC template matching 121 | FRUC bilateral matching | Classical Merge mode |
| --- | --- | --- | --- |
| Step 812 | 3*25*2 = 150 | 10*25*2 = 150 |  |
| Step 814 | 36*2 = 72 | 36*2 = 72 |  |
| Step 821 | 3*25*2 = 150 | 3*50 = 150 |  |
| Step 824 | 100*2 = 72 | 36*2 = 72 |  |
| Motion compensation | 242 | 242 | 242 |
| SUM | 392 | 392 | 242 |
| Per pixel | ~25 | ~25 | ~15 |

When all these embodiments are enabled with only N=3 predictors, the worst-case is less than twice the current worst-case for the classical motion compensation.

Figure 24:
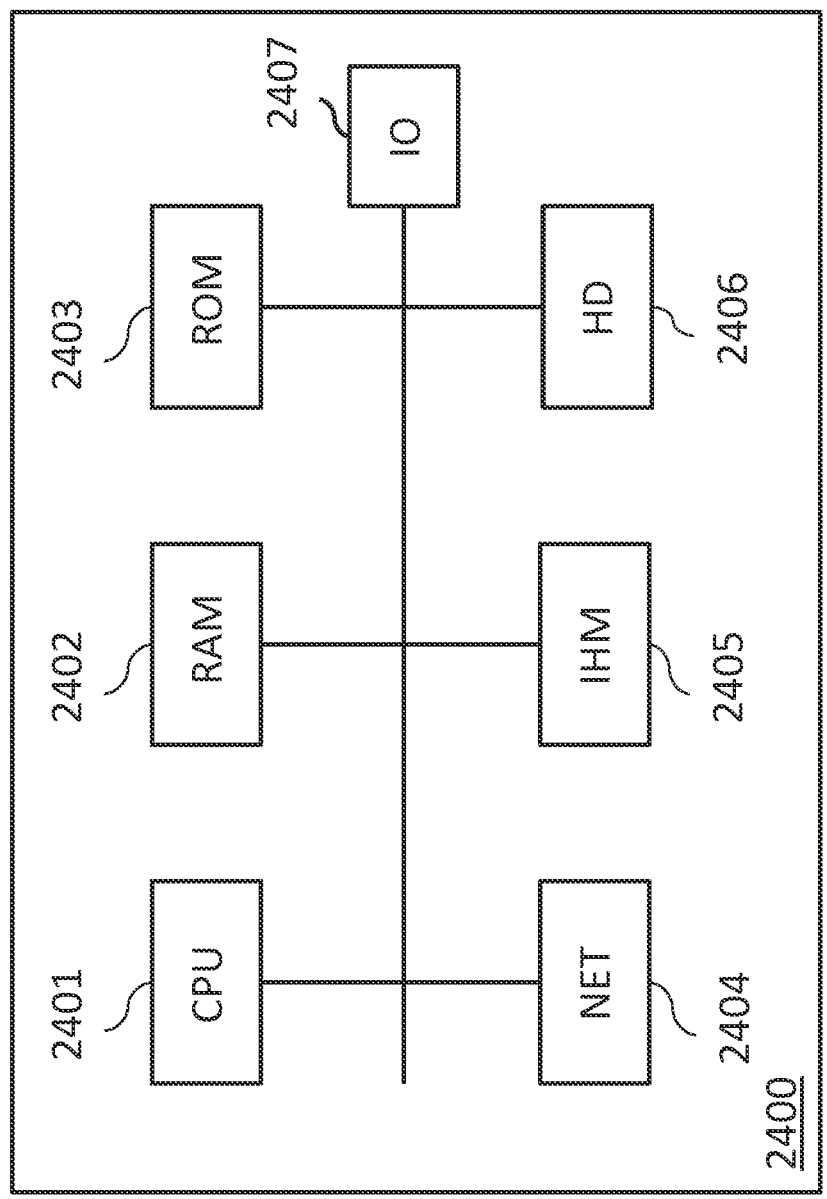
FIG. 24 is a schematic block diagram of a computing device for implementation of one or more embodiments of the invention.

FIG. 24 is a schematic block diagram of a computing device 2400 for implementation of one or more embodiments of the invention. The computing device 2400 may be a device such as a micro-computer, a workstation or a light portable device. The computing device 2400 comprises a communication bus connected to:
- a central processing unit 2401, such as a microprocessor, denoted CPU;
- a random access memory 2402, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 2403, denoted ROM, for storing computer programs for implementing embodiments of the invention;
- a network interface 2404 is typically connected to a communication network over which digital data to be processed are transmitted or received. The network interface 2404 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 2401;

a user interface 2405 may be used for receiving inputs from a user or to display information to a user;

a hard disk 2406 denoted HD may be provided as a mass storage device;

an I/O module 2407 may be used for receiving/sending data from/to external devices such as a video source or display.

The executable code may be stored either in read only memory 2403, on the hard disk 2406 or on a removable digital medium such as for example a disk. According to a variant, the executable code of the programs can be received by means of a communication network, via the network interface 2404, in order to be stored in one of the storage means of the communication device 2400, such as the hard disk 2406, before being executed.

The central processing unit 2401 is adapted to control and direct the execution of the instructions or portions of software code of the program or programs according to embodiments of the invention, which instructions are stored in one of the aforementioned storage means. After powering on, the CPU 2401 is capable of executing instructions from main RAM memory 2402 relating to a software application after those instructions have been loaded from the program ROM 2403 or the hard-disc (HD) 2406 for example. Such a software application, when executed by the CPU 2401, causes the steps of the flowcharts shown in Figures X to be performed.

Any step of the algorithm shown in Figure X may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for decoding image data comprising one or more frames from a bitstream, each frame being split into blocks of pixels, the method comprising for a block of pixels:

determining a motion vector for bi-prediction to be refined;

deriving pixel values in a search range for refinement of the determined motion vector, based on the determined motion vector to be refined;

performing first refinement which refines the determined motion vector based on the search range, to determine a first position for refinement of the determined motion vector, the first position corresponding to a best position in the first refinement;

performing second refinement which refines the first position at sub pixel accuracy, to determine a second position for refinement of the determined motion vector; and decoding the block of pixels using a motion vector based on the second position, when the second refinement is performed, wherein the motion vector based on the second position is not directly signalled in the bitstream when the second refinement is performed, wherein, when a pixel value outside of the search range is necessary for the second refinement, performing the second refinement is constrained so that the pixel value outside of the search range is not used.

2. The method of claim 1, wherein the second position is at 1/16 pixel accuracy.

3. The method of claim 1, wherein if pixel values within the search range are not available, the second refinement comprises selecting maximum full-pixel positions of said search range used for the first refinement.

4. A method for encoding image data comprising one or more frames into a bitstream, each frame being split into blocks of pixels, the method comprising for a block of pixels:

determining a motion vector for bi-prediction to be refined;

deriving pixel values in a search range for refinement of the determined motion vectors, based on the determined motion vector to be refined;

performing first refinement which refines the determined motion vector based on the search range, to determine a first position for refinement of the determined motion vector, the first position corresponding to a best position in the first refinement;

performing second refinement which refines the first position at sub pixel accuracy, to determine a second position for refinement of the determined motion vector; and encoding the block of pixels using a motion vector based on the second position without signalling, in the bitstream, the motion vector based on the second position, when the second refinement is performed, wherein, when a pixel value outside of the search range is necessary for the second refinement, performing the second refinement is constrained so that the pixel value outside of the search range is not used.

5. The method of claim 4, wherein the second position is at 1/16 pixel accuracy.

6. The method of claim 4, wherein if pixel values within the search range are not available, the second refinement comprises selecting maximum full-pixel positions of said search range used for the first refinement.

7. An apparatus for decoding image data comprising one or more frames from a bitstream, each frame being split into blocks of pixels, the apparatus comprising for a block of pixels:

a determining unit configured to determine a motion vector for bi-prediction to be refined;

a deriving unit configured to derive pixel values in a search range for refinement of the determined motion vector, based on the determined motion vector to be refined;

a first performing unit configured to perform first refinement which refines the determined motion vector based on the search range, to determine a first position for refinement of the determined motion vector, the first position corresponding to a best position in the first refinement;

a second performing unit configured to perform second refinement which refines the first position at sub pixel accuracy, to determine a second position for refinement of the determined motion vector; and a decoding unit configured to decode the block of pixels using a motion vector based on the second position, when the second refinement is performed, wherein the motion vector based on the second position is not directly signalled in the bitstream when the second refinement is performed, wherein when a pixel value outside of the search range is necessary for the second refinement, performing the second refinement is constrained so that the pixel value outside of the search range is not used.

8. The apparatus of claim 7, wherein the second position is at 1/16 pixel accuracy.

9. The apparatus of claim 7, wherein if pixel values within the search range are not available, the second refinement comprises selecting maximum full-pixel positions of said search range used for the first refinement.

10. An apparatus for encoding image data comprising one or more frames into a bitstream, each frame being split into blocks of pixels, the apparatus comprising for a block of pixels:

a determining unit configured to determine a motion vector for bi-prediction to be refined;

a deriving unit configured to derive pixel values in a search range for refinement of the determined motion vector, based on the determined motion vector to be refined;

a first performing unit configured to perform first refinement which refines the determined motion vector based on the search range, to determine a first position for refinement of the determined motion vector, the first position corresponding to a best position in the first refinement;

a second performing unit configured to perform second refinement which refines the first position at sub pixel accuracy, to determine a second position for refinement of the determined motion vector; and an encoding unit configured to encode the block of pixels using a motion vector based on the second position without signalling, in the bitstream, the motion vector based on the second position, when the second refinement is performed, wherein, when a pixel value outside of the search range is necessary for the second refinement, performing the second refinement is constrained so that the pixel value outside of the search range is not used.

11. The apparatus of claim 10, wherein the second position is at 1/16 pixel accuracy.

12. The apparatus of claim 10, wherein if pixel values within the search range are not available, the second refinement comprises selecting maximum full-pixel positions of said search range used for the first refinement.

13. A non-transitory computer-readable storage medium storing instructions of a computer program for implementing a method according to claim 1.

14. A non-transitory computer-readable storage medium storing instructions of a computer program for implementing a method according to claim 4.

* * * * *